(12) United States Patent
Balster

(10) Patent No.: US 9,721,159 B2
(45) Date of Patent: Aug. 1, 2017

(54) PERIODICITY ANALYSIS SYSTEM

(71) Applicant: Evan Donald Balster, Ames, IA (US)

(72) Inventor: Evan Donald Balster, Ames, IA (US)

( * ) Notice: Subject to any disclaimer, the term of this patent is extended or adjusted under 35 U.S.C. 154(b) by 91 days.

(21) Appl. No.: 14/875,404

(22) Filed: Oct. 5, 2015

(65) Prior Publication Data

US 2017/0098112 A1 Apr. 6, 2017

(51) Int. Cl.
*H04R 29/00* (2006.01)
*G06K 9/00* (2006.01)
*G10L 25/90* (2013.01)

(52) U.S. Cl.
CPC ....... *G06K 9/0053* (2013.01); *G06K 9/00503* (2013.01); *G10L 25/90* (2013.01); *H04R 29/008* (2013.01)

(58) Field of Classification Search
CPC ..... G96K 9/0053; H04R 29/008; G10L 25/90
USPC ....... 381/56, 58; 700/94; 704/206, 225, 233; 73/272 R; 367/13
See application file for complete search history.

(56) References Cited

U.S. PATENT DOCUMENTS

| 5,157,697 | A | 10/1992 | Anvari et al. | |
| 6,820,054 | B2* | 11/2004 | Erell | H03G 3/32 |
| | | | | 704/226 |
| 2016/0140975 | A1* | 5/2016 | Kamamoto | G10L 19/0212 |
| | | | | 704/203 |

OTHER PUBLICATIONS

Patricio De La Cuadra, "Pitch Detection Methods Review," https://ccrma.stanford.edu/~pdelac/154/m154paper.htm, unknown date.
Y. Tadokoro, W. Matsumoto, M. Yamaguchi, "Pitch detection of musical sounds using adaptive comb filters controlled by time delay," Multimedia and Expo, 2002. ICME '02. Proceedings. 2002 IEEE International Conference on (vol. 1 ), 2002, pp. 109-112, IEEE. Abstract.

* cited by examiner

*Primary Examiner* — Vivian Chin
*Assistant Examiner* — Ammar Hamid
(74) *Attorney, Agent, or Firm* — Brett J. Trout

(57) ABSTRACT

A system for identifying a periodicity-related attribute in a multi-frequency signal. The system is configured to produce phase and delay modulated signals from a complex input signal. The system is designed to combine these phase and delay modulated signals to identify a periodicity-related attribute associated with the multi-frequency signal. The system is configured to produce a physically perceptible output based on the identified periodicity-related attribute.

9 Claims, 9 Drawing Sheets

PERIODICITY ANALYSIS SYSTEM

TECHNICAL FIELD

The disclosed embodiments relate generally to a signal periodicity analysis system and, in particular, to a signal periodicity analysis system that identifies specific frequencies within a multi-frequency signal and produces a physically perceptible output in response thereto.

BACKGROUND

It is frequently desirable in signal processing to identify periodic phenomena in some function. In audio, a waveform that exhibits periodicity in time may be perceived as a pitched sound. In graphics, an image that exhibits periodicity in space may be perceived as a repeating pattern. Periodicities in other domains have other context-dependent meanings.

Prior art systems for identifying periodicity will, at minimum, attempt to determine a period of repetition in the domain of the signal. That domain may be time, space or some other domain. Prior art techniques for identifying periodicity approached the problem by testing a finite number of predetermined periods for some measure of self-similarity.

Known autocorrelation systems determine the self-similarity of a signal over one or more intervals. These systems use delay and multiplication; cepstrum analysis, which applies a Fourier transform to the signal and evaluates the periodicity of the resulting magnitude spectrum; and various other Fourier-based methods to identify periodicity in signal processing.

One drawback associated with such prior art systems is overtone aliasing, whereby upper harmonics of one fundamental frequency may appear as different upper harmonics of a different fundamental frequency. A change in fundamental frequency ($\Delta F$) results in a larger change in each upper harmonic. The change in each upper harmonic can be represented as $h\Delta F$ for each harmonic number h. Such systems make upper harmonics both more likely to fall outside the ranges of detection for the nearest analyzed period, and more likely to appear as aliases in more distant analyzed periods. Avoiding overtone aliasing would require a large number of analysis periods, requiring a large amount of computer processing power.

Another drawback associated with such prior art systems, particularly those that use long stretches of signal to make the determination, is the difficulty in using such systems to identify periodicity in waveforms having a variable periodicity.

While some systems using zero-crossing algorithms do not require specific periodicities to be monitored and require less computational power to execute, such systems have their own limitations. Systems using zero-crossing algorithms are commonly used for simple periodicity detectors such as guitar tuners. While such systems function well when a specific, known harmonic of the periodic activity (typically the fundamental) accounts for a majority of the energy in the signal subjected to the zero-crossing process, these systems have difficulty identifying periodicity in more complex waveforms. Thus, the applicability of such systems is substantially more limited than the systems described above.

The present invention is a "self-attunement" system, using one periodic analysis mechanism to do the work of many systems by dynamically adjusting itself to synchronize with signal periodicities. An earlier version of the present invention used self-attuning resonator cells that adjusted themselves to various periodicities in waveforms.

This earlier version of the present invention subjected an input signal to a phase process that generated a signal QA using a first-difference filter and generated a signal QB using a feedback comb filter (a trivial form of the helical resonator (HIR) described below) followed by a two-sample moving average filter. These signals exhibited total, exact quadrature at all frequencies. The system delayed QA by the analysis period, then multiplied the delayed QA by QB. The system divided the resulting product averaged over a small interval of time by a harmonic mean of the average power of QB and QA over the same small interval of time. The system then scaled by a hand-selected "attunement rate" to effect in a change in the analysis period of the system during a subsequent resampling of the waveform.

The system used dynamic resampling to repeatedly adjust the resampling analysis period. The resonator in this system oscillated with a period of L internal samples, where L is a predetermined and immutable property of the resonator and also acted as the analysis period. The external input signal (waveform) was sampled by the system to produce internal samples using a variable timestep R, measured in fractional external samples. The system's resonator's fundamental frequency was then S/RL, where S was the sampling rate in hertz. When the self-attunement system acted to increase the fundamental frequency of the resonator, the timestep was lowered and when the self-attunement system acted to decrease the fundamental frequency, the timestep was raised. This process facilitated self-attunement, but induced distortion into the signal and metrics which were not counteracted in this earlier version of the present invention.

The method of quantifying periodicity in this earlier system was called "convergence", but was evaluated using a different method than the one employed in the present invention. In the earlier system, the internal input signal of the resonator was compared with an internal output signal generated by subjecting the internal input to an HIR filter. The metric was derived by comparing the power of the internal input, the internal output, and a difference signal produced by subtracting the two.

The earlier system used a rack or plurality of resonators, where resonators were assigned overlapping ranges covering a range of fundamental frequencies within the waveform to be analyzed. Unlike in the present invention, the resonator rack of the earlier version of the system performed no phase processing, which was done within the individual resonators of the older system.

Unfortunately, this earlier version of the present invention was unreliable and/or unresponsive for identifying periodicity in waveforms in applications such as vocal pitch tracking. Because the phase process of this earlier version assigned higher frequencies greater influence on the period adjustment, the system increased the likelihood that harmonic aliasing would result in incorrect attunement.

SUMMARY OF THE DISCLOSED SUBJECT MATTER

The deficiencies described above are overcome by the disclosed implementation of a signal periodicity analysis system. The analyzer receives a multi-frequency signal, divides the signal into at least two signals, at least one of which is phase shifted relative to the other at a predetermined target frequency and at least one of which is provided with a group delay different than the other. The analyzer multiplies the two signals to produce a modulated output from which the analyzer identifies a periodicity-related attribute and produces a physically perceptible output based on that periodicity-related attribute.

Other implementations of signal periodicity analysis systems are disclosed, including implementations directed to analog and digital signal analyzers, as well as vector-based signal analyzers.

BRIEF DESCRIPTION OF THE DRAWINGS

The present invention will now be described, by way of example, with reference to the accompanying drawings in which.

DETAILED DESCRIPTION OF THE DRAWINGS

The system of the present invention precisely measures a signal periodicity in a signal through a process of gradual adjustment in the working period. The system described below is distinguished over earlier systems in that the present system assigns greater influence to lower frequencies in the analyzed signal by using integrators, rather than the differentiators used in earlier version of the system. The use of integrators rather than differentiators significantly increases the range of fundamental frequencies that a single resonator may monitor. One embodiment of the present system uses a vector attunement formula that employs at least two shift-modulations and time distortion countermeasures to adjust the working period quickly while reducing the likelihood that the adjustment may overshoot the correct value of the desired periodicity, resulting in lower latency and greater accuracy.

The present system can make accurate determinations of periodicity within a small window of time, even in a real-time signal, without requiring massive computational resources. In one embodiment of the present invention, the system is capable of identifying, measuring and imitating musical pitch with a high degree of synchronicity. This embodiment allows the user to interface a voice or musical instrument with any MIDI-compatible technology, including virtual musical instruments, as well as digital and analog synthesizers. The present system thereby expands the accessibility of musical composition, education and play.

The present system may be used in music applications where pitch and tonality may be measured and translated to other formats with a high degree of precision and minimal latency. The system may also be used in speech analysis applications, where isolation and inspection of the periodic and non-periodic components of a voice signal is the basis for interpretation thereof. The system may be used in machine instrumentation, where the system can monitor oscillating mechanisms for a predetermined operating frequency or rate of revolution. The present system is also adaptable to a wide array of additional signal processing applications.

In addition to real-time analysis, the present invention can improve upon the accuracy and computational cost of non-time-sensitive applications such as analyzing recorded audio, image recognition, and analysis of mathematical functions.

Figure 1:
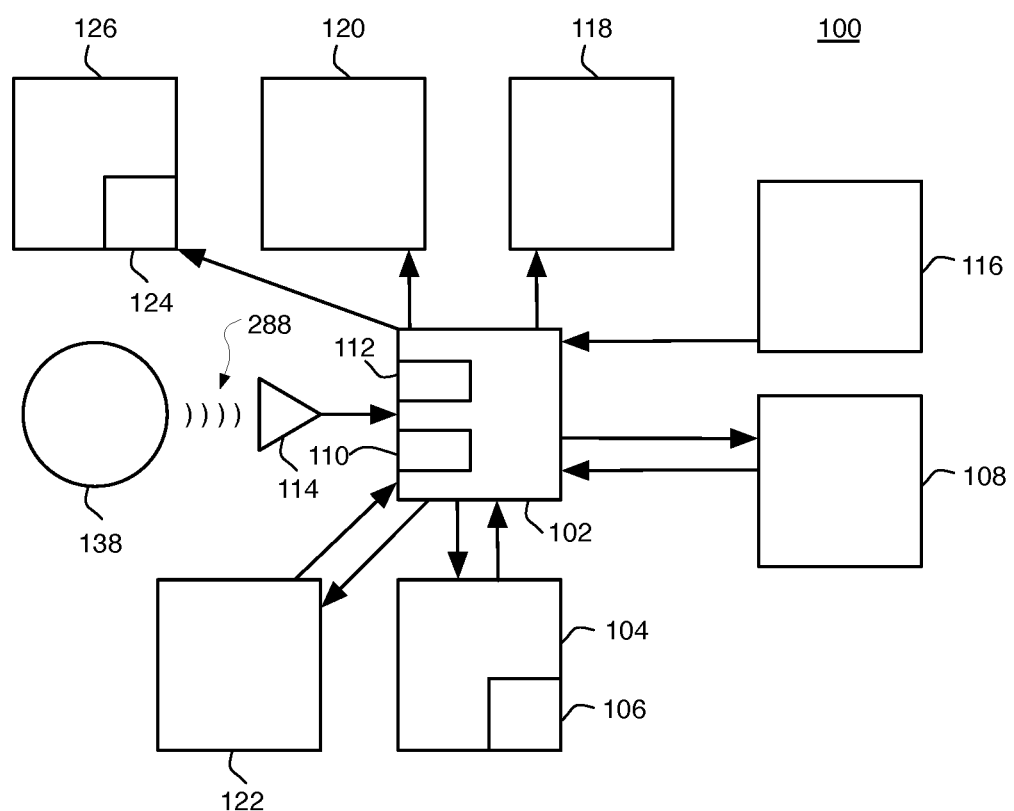
FIG. 1 illustrates a block diagram of the system architecture in accordance with one embodiment.

As shown in FIG. 1, a periodicity analysis system (100) is shown having an input receiver (102), a signal processor (104), a modulation unit (106) and a periodicity unit, such as a display system (108). The input receiver (102) is preferably a computer having a central processing unit (CPU) (110) and a memory storage system (112). The display system (108) is preferably a touchscreen coupled to the computer. Coupled to input receiver (102), is a multi-frequency signal input device, such as microphone (114), a command input device, such as a keyboard (116), a haptic display system, such as a Braille terminal (118), an audio output, such as a speaker (120), a MIDI device, such as an electronic keyboard (122), and a mechanical control, such as an electronic switch (124), coupled to a waveform generating machine, such as a washing machine (126). While the display system (108) is physically coupled to the input receiver (102), and the signal processor (104), a modulation unit (106) are integrated with the input receiver (102), the foregoing devices may be integrated with the input receiver (102) or coupled thereto, or to one another by wires or wirelessly.

Figure 2:
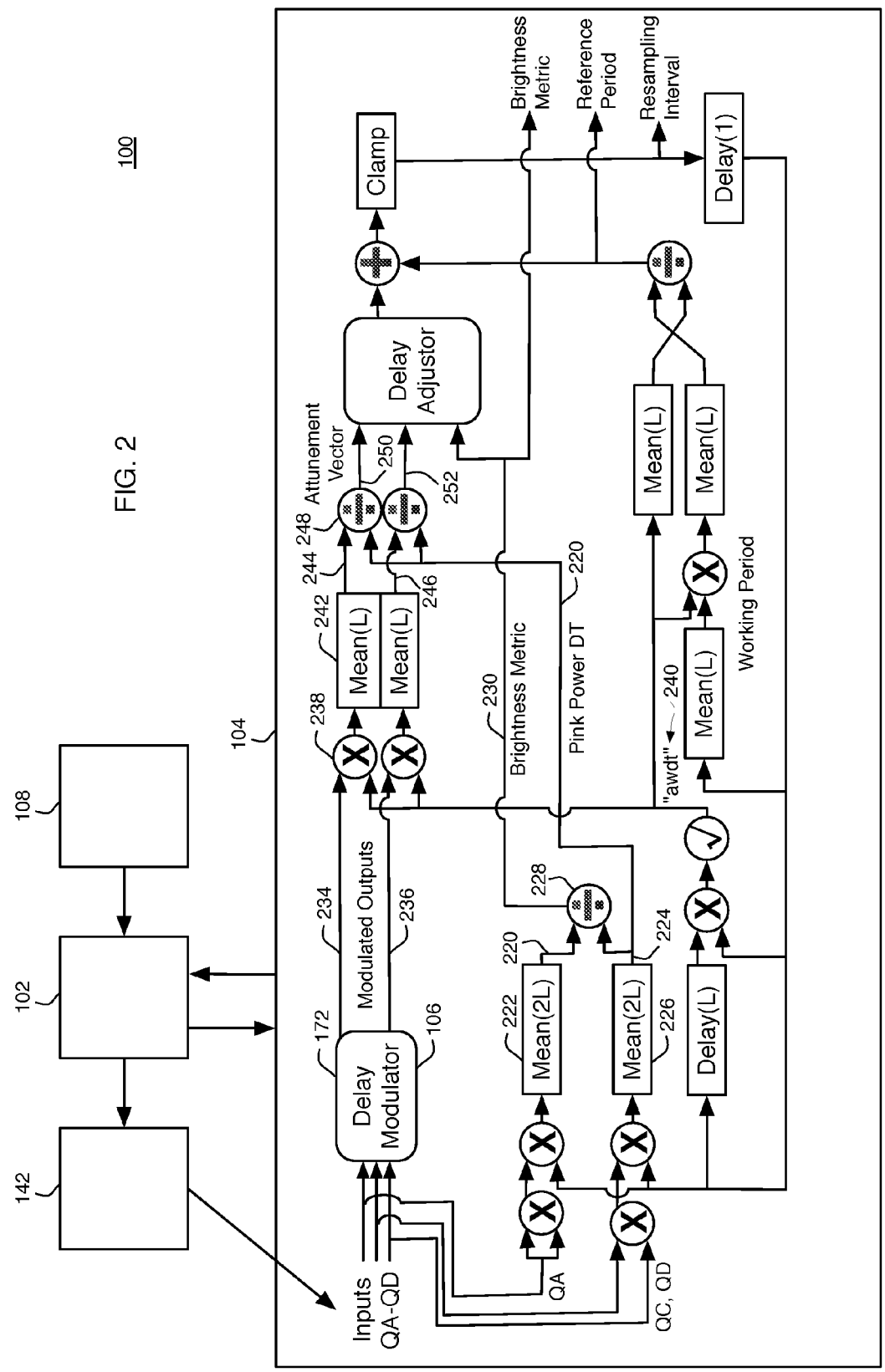
FIG. 2 illustrates a block diagram of the self-attunement system in accordance with one embodiment.
Figure 3:
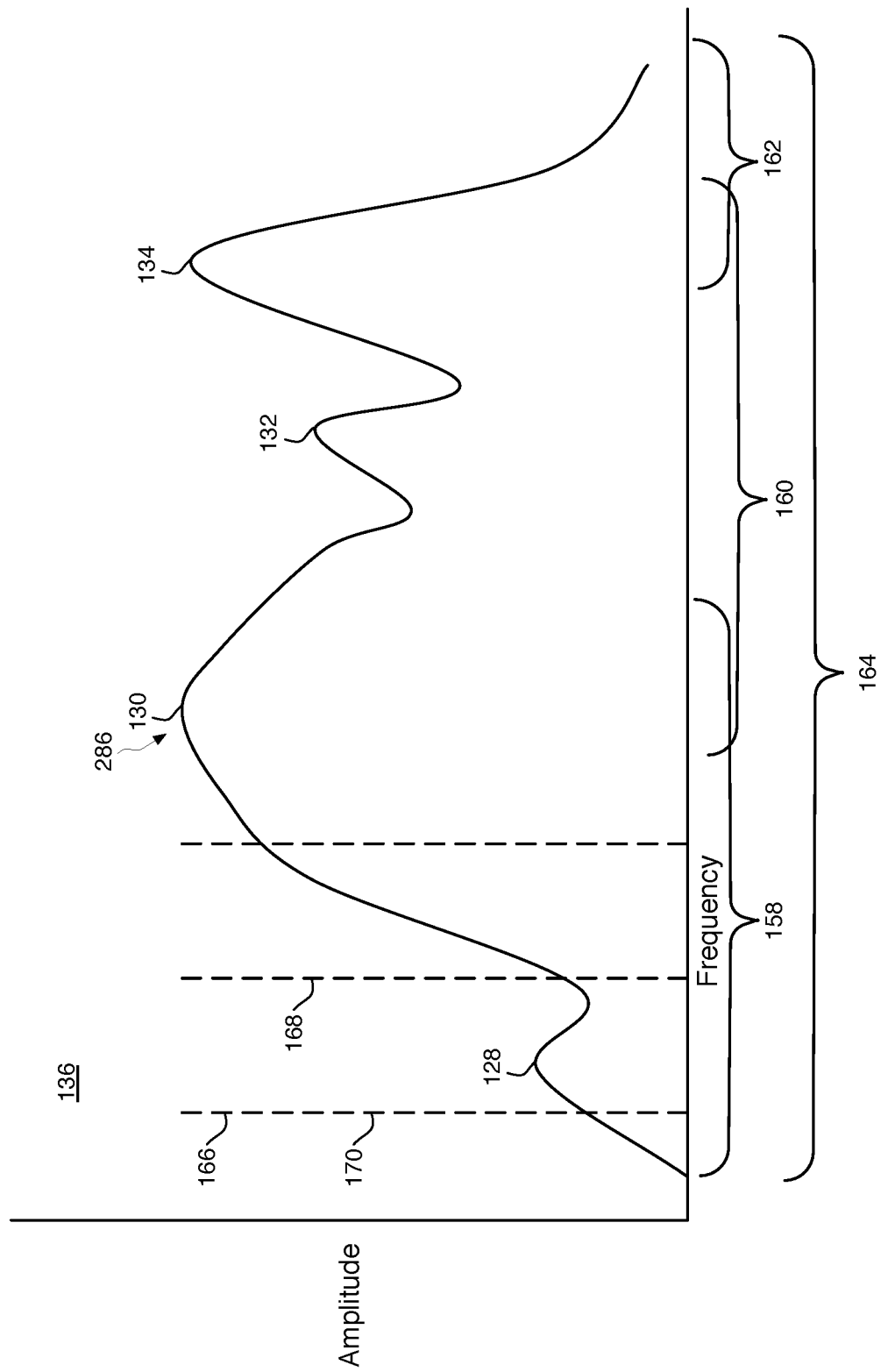
FIG. 3 illustrates an example graph showing the multi-frequency signal, fundamental frequency, fundamental frequency ranges, target frequencies, and predetermined frequency range.
Figure 4:
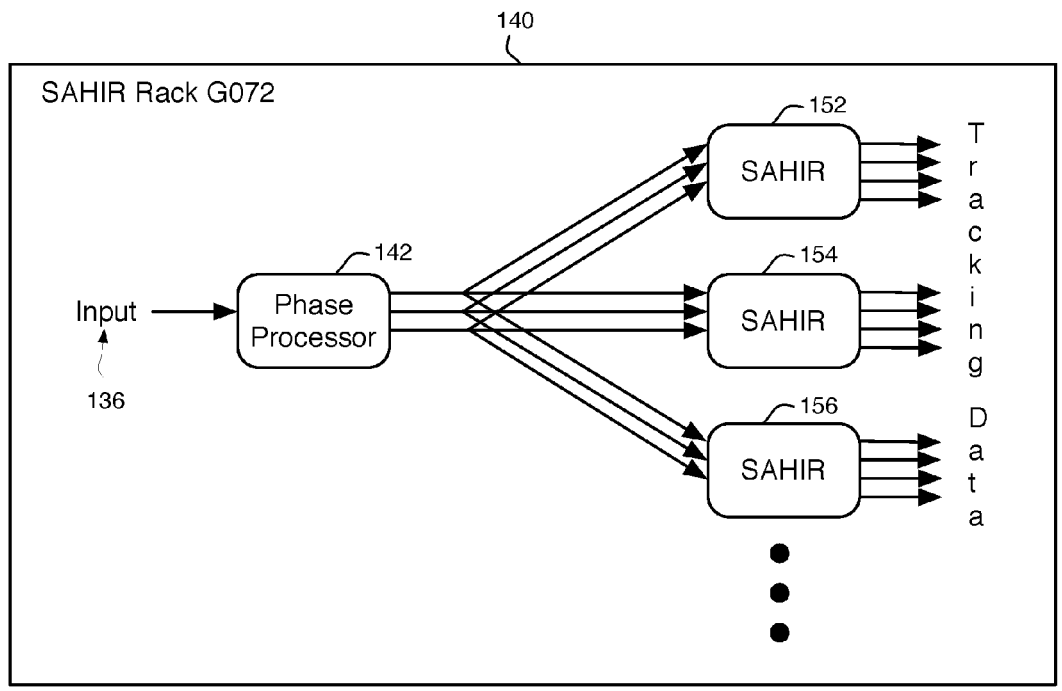
FIG. 4 illustrates a block diagram of the self-attuning helical resonator rack in accordance with one embodiment.

The periodicity analysis system (100) is shown in more detail in FIG. 2. As shown, the modulation unit (106) is integrated into the signal processor (104). The signal processor (104) and modulation unit (106) are provided to identify specific frequencies (128), (130), (132), and (134) within a multi-frequency signal (136), such as a user's voice. FIGS. 2-3. Once a user (138) sings or speaks into the microphone (114), the microphone (114) converts the voice to electronic signals provided to the input receiver (102). The signal processor (104) and modulation unit (106), being software loaded onto the memory (112) of the input receiver (102), or otherwise accessed by the input receiver (102), begin attempting to identify the specific frequencies (128), (130), (132), and (134) within the multi-frequency signal (136) as show in the graph of FIG. 3. FIGS. 1 and 3. In furtherance of this operation, the signal processor (104) has a self-attuning helical resonator (SAHIR) rack (140). FIG. 4. The signal processor (104) comprises all elements of the (SAHIR) rack (140) except for the delay-modulator (172) and the delay adjustor (254) described below. The (SAHIR) rack (140) receives the multi-frequency signal (136) from the input receiver (102), feeds the multi-frequency signal (136) through a phase processor (142), As explained more fully below, the phase processor (142) converts the multi-frequency signal (136) into a plurality of signals. In the preferred embodiment, are referred to as QA (144), QB (146), QC (148), and QD (150). Once the phase processor (142) uses the multi-frequency signal (136) to produce the output signals QA (144), QB (146), QC (148), and QD (150), the output signals QA (144), QB (146), QC (148), and QD (150) are then distributed to a plurality of SAHIRs (152), (154), and (156) of the SAHIR rack (140). These SAHIRs (152), (154), and (156) cover a range of fundamental frequencies (158), (160), and (162) present in the multi-frequency signal (136), allowing periodic activity within that range to be identified. The SAHIRs (152), (154), and (156) are preferably distributed across a predetermined frequency range (156) such that the range of each of the SAHIRs (152), (154), and (156) overlaps with the range of one or more other SAHIRs (152), (154), and (156).

As the SAHIRs (152), (154), and (156) are constructed substantially similarly, except for the particular frequency they analyze, description will be limited to the one SAHIR (152), with the understanding that SAHIRs (154) and (156) and any other additional SAHIRs desired are similarly constructed. Preferably, each SAHIR (152) defines multiple target frequencies (166) and (168). These target frequencies (166) and (168) are any two multiples of the fundamental frequency (170). The fundamental frequency is equal to S/RL, where S is the sampling rate in hertz, L is the resolution of the particular SAHIR (152) and R is the resampling interval. Thus, each SAHIR (152) defines different target frequencies (166) and (168). More specifically, the fundamental frequency (170) of the SAHIR (152), expressed in hertz, is one divided by the working period used in a delay modulator (172) of the signal processor (104), as expressed in seconds. In the preferred embodiment, the fundamental frequency (170) of a given SAHIR (152) is the first target frequency (166), and twice the fundamental frequency of that particular SAHIR (168) is the second target frequency. Similarly, additional target frequencies beyond these first two exist for each multiple of the fundamental frequency (170) of the particular SAHIR (152) up to that particular SAHIR's (152) Nyquist frequency. The SAHIR (152) isolates harmonic activity within the signal (114) at the target frequencies, while rapidly adjusting the SAHIR's (152) fundamental frequency to synchronize with harmonics within the signal (114) that are nearby the SAHIR's (152) target frequencies. This allows SAHIR (152) to analyze a range of periodicities or frequencies (128) and (130) near the fundamental frequency (170) within the multi-frequency signal (136) and track these periodicities even as the periodicities change in period.

For ease of understanding of the present invention, this application employs several instances of computer software pseudocode. Pseudocode is conventionally structurally similar to actual computer code, but somewhat less detailed. Pseudocode for the preferred SAHIB (152) is presented along with the following parameters:

freq_center—This is the base frequency, which is the fundamental frequency at the logarithmic center of this particular SAHIR's (152) range of possible frequencies. This frequency is expressed as a normalized frequency to simplify other formulas.

freq_range—This is the frequency range, which is a range of frequencies around the base frequency, expressed as a multiplication/division factor. The full range of frequencies is (freq_center/freq_range) to (freq_center*freq_range).

resolution—This is the resolution of the helical resonator (denoted by L in many formulas).

```
class SAHIR_0_7_2
{
    //Input pre-processing
    float                       amp_QB, amp_QCD;
    Bandpass_LR2                bandpass_QA, bandpass_QB,
                                bandpass_QC, bandpass_QD;
    //Pre-processed input at fixed sampling rate
    Sample[ ]                   fix_QA, fix_QB, fix_QC,
                                fix_QD;
    //Resampling
    Resample_4P_Hermite         resampler;
    float                       t_fraction;
    //Internal (variable-samplerate) signals
    int                         vsr_t;
    Sample[ ]                   vsr_QA, vsr_QB, vsr_QC,
                                vsr_QD;
    //Convergence metric & HIR
    HIR_Convergence_Power       convergence;
    Sample[ ]                   vsr_QA_hir, vsr_convergence;
    //Attunement System
    SelfAttuner_0_7_2           attuner;
    void setup(
        int     resolution,
        float   normfreq_center,
        float   frequency_range,
        float   normfreq_vpp_unity_gain)
    {
        // Internal timer starts at zero
        vsr_t = 0;
        t_fraction = 0.0;
        // Input bandpass configuration
        float
            band_lo = .50   * (normfreq_center /
                              frequency_range)
            band_hi = .25   * (normfreq_center *
                              frequency_range)
                            * resolution;
        bandpass_QA.setup(band_lo, band_hi);
        bandpass_QB.setup(band_lo, band_hi);
        bandpass_QC.setup(band_lo, band_hi);
        bandpass_QD.setup(band_lo, band_hi);
        // Input amplification factors
        amp_QB = normfreq_center / normfreq_vpp_unity_gain;
        amp_QCD = sqrt(QB_amp);
        // Set up attuner
        attuner.setup(
            resolution, normfreq_center, frequency_range);
        // A very simple HIR prototype filter.
        Lowpass hir_integrator = new Lowpass_BW1;
        hir_integrator.setup(1.0 / (2.0 * π))
        // Set up the HIR / Convergence unit
        convergence.setup(
            resolution, hir_integrator);
    }
    void process(
        Sample[ ]   in_QA,
        Sample[ ]   in_QB,
        Sample[ ]   in_QC,
        Sample[ ]   in_QD,
        Range       range)
    {
        // Apply band-pass filters to input.
        bandpass_QA.process(in_QA, fix_QA, range);
        bandpass_QB.process(in_QA, fix_QB, range);
        bandpass_QC.process(in_QC, fix_QC, range);
        bandpass_QD.process(in_QD, fix_QD, range);
        // Amplify inputs for unity gain at SAHIR base frequency
        for (int t in range)
        {
            fix_QB[t] *= QB_amp;
            fix_QC[t] *= QCD_amp;
            fix_QD[t] *= QCD_amp;
        }
        // Perform variable-rate processing on the prepared signals
        for (int t in range)
        {
            // Acquire samples until we pass time 't'
            while (t_fraction < 1.0)
            {
                // Acquire a new sample at the internal rate.
                vsr_QA[vsr_t] = resampler.sample(fix_QA, t,
```

```
            t_fraction);
        vsr_QB[vsr_t] = resampler.sample(fix_QB, t,
            t_fraction);
        vsr_QC[vsr_t] = resampler.sample(fix_QC, t,
            t_fraction);
        vsr_QD[vsr_t] = resampler.sample(fix_QD, t,
            t_fraction);
        // Perform HIR processing & convergence metric
        convergence.process(
            vsr_QA, vsr_QA_hir,
            vsr_convergence, vsr_t..vsr_t+1);
        // Compute a new rate with the attunement system.
        attuner.process(
            vsr_QA, vsr_QB, vsr_QC, vsr_QD, vsr_t);
        // Advance internal time, and our resampling clock.
        t_fraction += attuner.resampling_interval( );
        ++vsr_t;
      }
      t_fraction -= 1.0;
    }
  }
}
```

Figure 5:
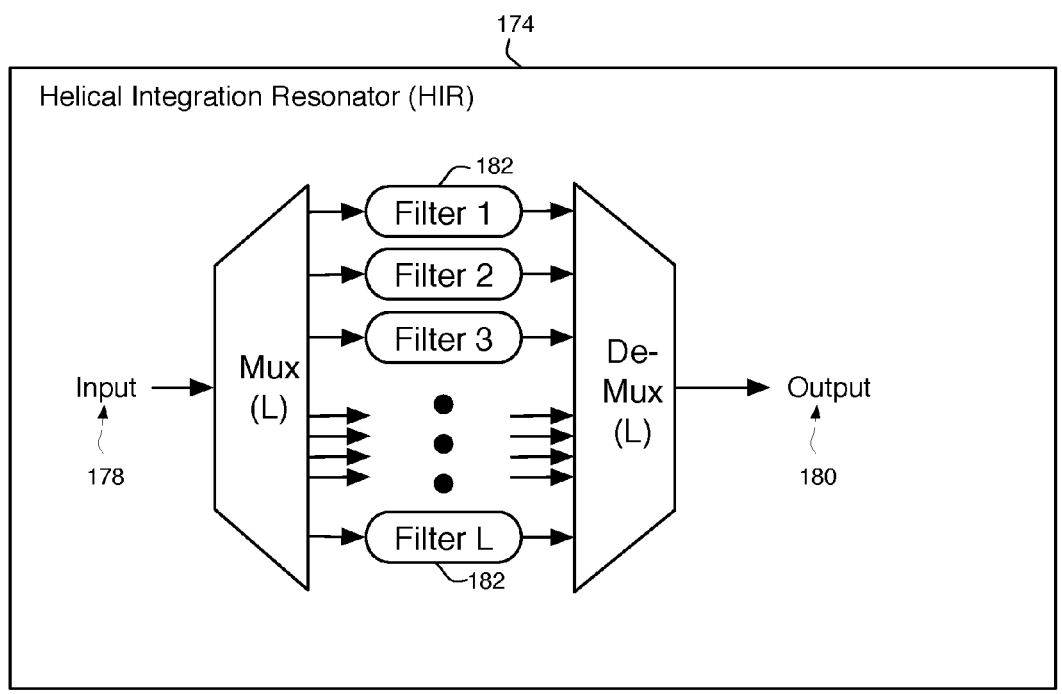
FIG. 5 illustrates a block diagram of the helical resonator in accordance with one embodiment.

The SAHIR (152) incorporates known waveform isolators, known as Helical Integration Resonators (HIR) (174). As shown in FIG. 5, an HIR (174) has some number "L" of low-pass filters, called integrators (176), arranged in a ring (182). A modulo L counter is incremented with each sample of the input signal received, and used to control a multiplexer and demultiplexer scheme selecting one of the integrators. The selected integrator receives a sample of the input signal (178) and produces a sample of the output signal (180) for the same point in time.

The HIR has at most L/2 partial frequencies. The filter type defining the integrators in the HIR (174) determines which frequencies the HIR (174) accepts and which the HIR (174) ignores. The HIR (174) preferably uses low-pass filters with peak gain at a frequency of zero.

Pseudocode for the preferred MR (174) filter is as follows:

```
class HIR : Filter
{
    struct Phase_Line
    {
        Sample[ ] input;
        Sample[ ] output;
    }
    int                resolution;
    Phase_Line[ ]      phase_lines;
    Filter             integrator;
    void setup(
        int        use_resolution,
        Filter     use_integrator)
    {
        integrator = use_integrator;
        resolution = use_resolution;
        phase_lines = new Phase_Line[resolution];
    }
    function process(
        Sample[ ] input, Sample[ ] output, Range range)
    {
        for (t in range)
        {
            //Select the current phase Line and our place within it.
            // (division here is truncating)
            Phase_Line current_phase = phase_lines[t % resolution];
            int phase_time = t / resolution;
            //Copy HIR input to phase line input.
            current_phase.input[phase_time] = input [t];
            //Run the integrator filter for one sample.
            integrator.process(
                current_phase.input, current_phase.output,
                Range(phase_time .. phase_time+1));
            //Copy phase line Output to HIR output.
            output[t] = current_phase.output[phase_time]
        }
    }
}
```

In the preferred embodiment, the signal processor (104) receives input signals QA (144), QB (146), QC (148), from the phase processor (142). As shown in FIG. 2, signal processor (104) subjects the input signals QA (144), QB (146), QC (148), and QD (150) to a Second-Order Linkwitz-Riley Bandpass that eliminates any frequencies high enough to cause aliasing, as well as any frequencies that are significantly lower than the SAHIR's (152) fundamental frequency (170). The signal processor (104) also amplifies the input signals QA (144), QB (146), QC (148), and QD (150) to shift their unity-gain frequency to the center frequency of the SAHIR (152). As noted above, the center frequency is the base frequency with which the SAHIR (152) is originally configured, which is the fundamental frequency (170) at the logarithmic center of a particular SAHIR's (152) range (158) of possible frequencies. The center frequency is expressed as a normalized frequency to simplify other formulas.

Figure 6:
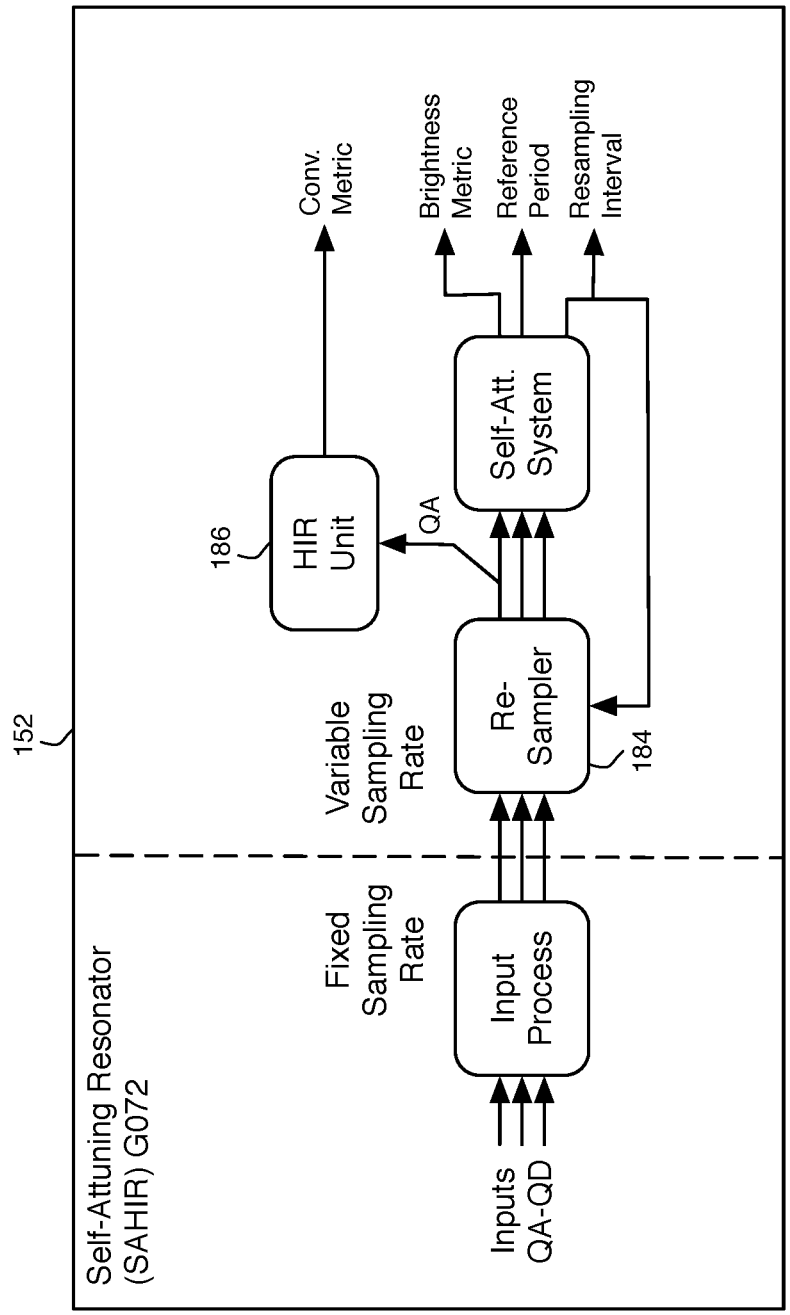
FIG. 6 illustrates a block diagram of the self-attuning helical resonator in accordance with one embodiment.
Figure 13:
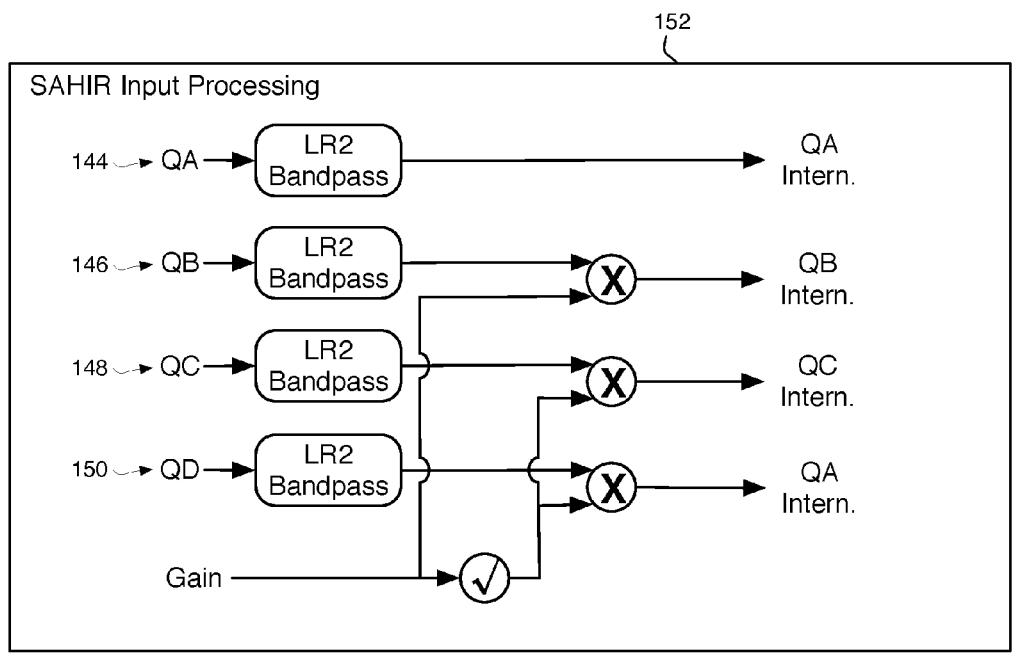
FIG. 13 illustrates a block diagram of the SAHIR input processing in accordance with one embodiment.

The SAHIR (152) receives and modifies QA (144), QB (146), QC (148), and QD (150) using bandpass filters as shown in FIG. 13. As shown in FIG. 6 the SAHIR (152) modifies QA (144), QB (146), QC (148), and QD (150). The SAHIR (152) provides the modified signals to a resampler (184) that extracts samples from the amplified input signals QA (144), QB (146), QC (148), and QD (150) at an interval dictated by the self attuner (188). The SAHIR (152) uses this new sample interval to determine the time the SAHIR (152) takes the next sampling.

While the implementation of the filters, resampling formula, and decibels to an amplitude coefficient conversion used in the SAHIR (152) may be by any process known in the art, they are implemented as follows:

In the preferred embodiment, the first-order Butterworth filters are designed using a bilinear transformation formula with no special compensation for frequency warping. The Second-Order Linkwitz-Riley filters are designed by placing the aforementioned Butterworth filters in series, with the Linkwitz-Riley bandpass being a Linkwitz-Riley lowpass in series with a Linkwitz-Riley highpass. The rectangular mean filter is implemented as a fixed point cascaded-integrator-comb operation running in constant time per sample. The resampling algorithm used in the SAHIR (152) is a standard four-point hermite formula. The decibel to amplitude conversion is performed with a formula known in the art and represented in pseudocode below.

Pseudocode for the preferred resampler, filters and decibel to amplitude conversion is as follows:

```
float Decibels_to_Amplitude(
        float decibels)
{
    return pow(10.0, decibels/20.0);
}
//First-Order Butterworth Lowpass
class Lowpass_BW1 : Filter
{
    float α;
    function setup(
```

```
        float normalized_cutoff_frequency)
    {
        α   = (1 − π * normalized_cutoff_frequency)
              / (1 + π * normalized_cutoff_frequency);
    }
    void process(
        Sample[ ] input, Sample[ ] output, Range range)
    {
        for (int t in range)
        {
            output[t] =
                ((1 − α) / 2) *
                (
                          input [t ] * 1
                    +     input [t−1] * 1
                )
                    +     output[t−1] * α;
        }
    }
}
//First-Order Butterworth) Highpass
class Highpass_BW1 : Filter
{
    float α;
    function setup(
        float normalized_cutoff_frequency)
    {
        α   = (1 − π * normalized_cutoff_frequency)
              / (1 + π * normalized_cutoff_frequency);
    }
    void process(
        Sample[ ] input, Sample[ ] output, Range range)
    {
        for (int t in range)
        {
            output[t] =
                ((1 + α) / 2) *
                (
                          input [t ] * 1
                    +     input [t−1] * −1
                )
                    +     output [t−1] * α;
        }
    }
}
//Second-Order Linkwitz-Riley Lowpass
class Lowpass_LR2
{
    Lowpass_BW1                 lp1, lp2;
    //Intermediate signal
    Sample[ ]                   temp;
    void setup(
        float normalized_cutoff_frequency)
    {
        lp1.setup(normalized_cutoff_frequency);
        lp2.setup(normalized_cutoff_frequency);
    }
    void process(
        Sample[ ]               input,
        Sample[ ]               output,
        Range                   range)
    {
        //Multi-stage processing
        lp1.process(input,      temp,            range);
        lp2.process(temp,       output,          range);
    }
}
//Second-Order Linkwitz-Riley Highpass
class Highpass_LR2
{
    Highpass_BW1                hp1, hp2;
    //Intermediate signal
    Sample[ ]                   temp;
    void setup(
        float normalized_cutoff_frequency)
    {
        hp1.setup(normalized_cutoff_frequency);
        hp2.setup(normalized_cutoff_frequency);
    }
    void process(
        Sample[ ]               input,
        Sample[ ]               output,
        Range                   range)
    {
        //Multi-stage processing
        hp1.process(input,      temp,            range);
        hp2.process(temp,       output,          range);
    }
}
//Second-Order Linkwitz-Riley Bandpass
class Bandpass_LR2
{
    Lowpass_LR2                 lowpass;
    Highpass_LR2                highpass;
    //Intermediate signal
    Sample[ ]                   temp;
    void setup(
        float normalized_low_frequency,
        float normalized_high_frequency)
    {
        highpass.setup(normalized_low_frequency);
        lowpass .setup(normalized_high_frequency);
    }
    void process(
        Sample[ ]               input,
        Sample[ ]               output,
        Range                   range)
    {
        //Multi-stage processing
        highpass.process(input,      temp ,      range);
        lowpass .process(temp,       output,     range);
    }
}
//A rectangular mean filter.
//   Also known as boxcar averager or Cascaded Integrator-Comb filter.
class Rectangular_Mean
{
    int             size;
    fixed           total;
    fixed           storage[ ];
    void setup(int config_size, float starting_value)
    {
        fixed fixed_starting_value = fixed (starting_value);
        // Initial size, content and total
        size = config_size;
        total = size * fixed_starting_value;
        for (int i = 0; i < size; ++i) storage[i] = fixed_starting_value;
    }
    void update(int t, float sample_value)
    {
        fixed
            new_value = fixed(sample_value),
            old_value = storage[t % size];
        // Adjust total and store new value.
        total += (new_value − old_value);
        storage[t % size] = new_value;
    }
    float mean( )
    {
        return float(total / size);
    }
}
//A four-point hermite resampling algorithm; no anti-alasing.
class Resample_4P_Hermite
{
    Sample sample(
        Sample[ ]               signal,
        int                     t,
        float                   t_frac)
    {
        // Compute coefficients or cubic polynomial
        Sample
            c1 = 0.5 * (in[t−1]        − in[t−3]),
            c2 = in[t−3] − 2.5*in[t−2] + 2.0*in[t−1] − 0.5*in[t],
            c3 = 0.5 * (in[t]          − in[t−3]) + 1.5 * (in[t−2] −
                 in[t−1]);
```

```
        // Compute the polynomial itself
        return ( (c3 * t_frac + c2) * t_frac + c1) * t_frac + in[t-2];
    }
}
```

A HIR convergence unit (186), as shown in FIG. 6, measures a relationship between the input and output of the HIR (174) filter, which can be used to determine whether the input signal is periodic over the HIR's (166) period. This relationship is called "convergence" by convention. The HIR convergence unit (186) uses two identical instances of the underlying HIR (174) to compute convergence. In the preferred embodiment, the HIR convergence unit (186) uses the same HIR Integrator for both. The same HIR Integrator, however, need not necessarily be used for both.

Figure 7:
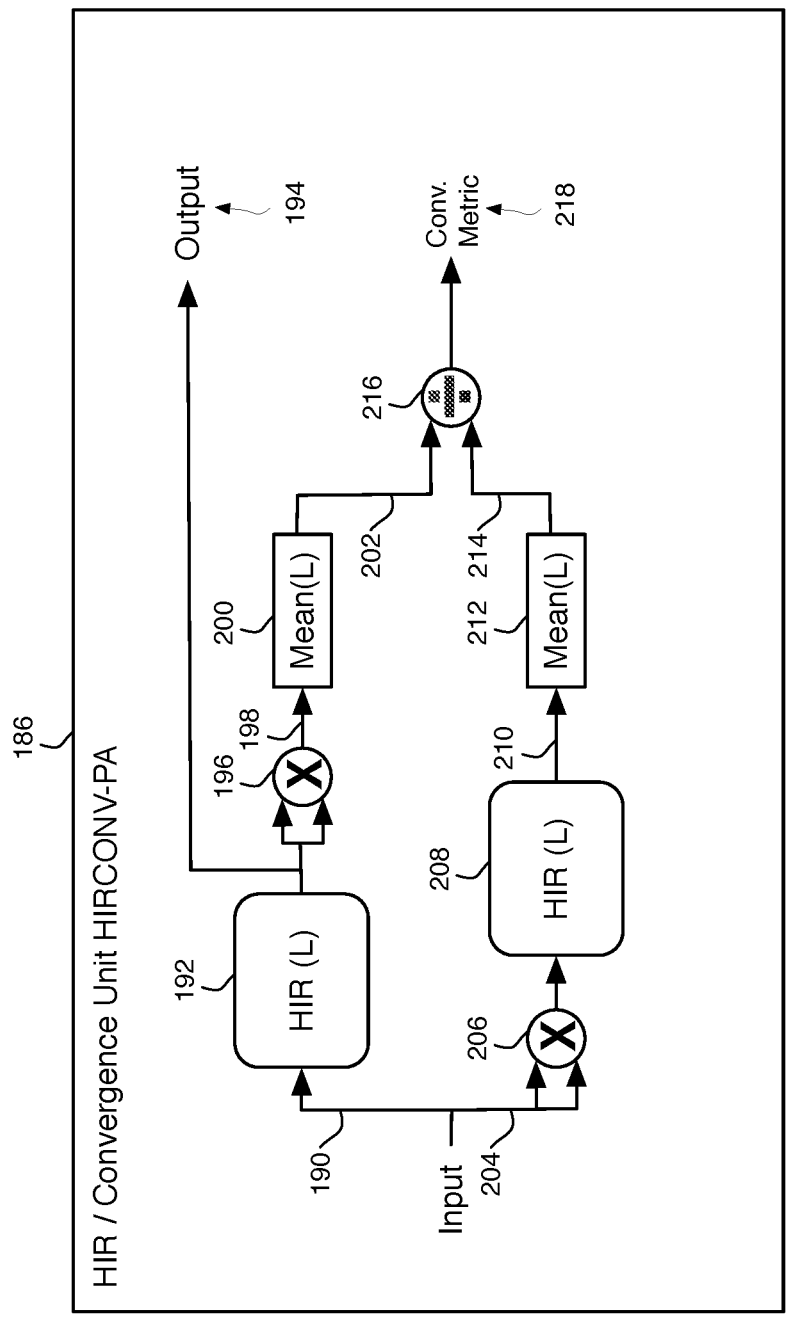
FIG. 7 illustrates a block diagram of the helical resonator convergence unit in accordance with one embodiment.

As shown in FIG. 7 in a first signal path (190), the HIR convergence unit (186) of the SAHIR (152) passes the input QA (144) through an HIR (192) to produce the HIR output (194), which may be copied and used elsewhere. The HIR convergence unit (186) also squares (196) the HIR output (194) and then averages the output (198) over L samples using a rectangular mean (200) to produce the HIR output power (202). In a second signal path (204), the HIR convergence unit (186) squares (206) the input QA (144), and passes it through a second HIR (208). The HIR convergence unit (186) averages the second HIR (208) output (210) over L samples using another rectangular mean filter (212), producing an HIR reference power (214). The HIR convergence unit (186) divides (216) the HIR output power (202) by the HIR reference power (214) to produce a convergence metric (219). A small value c may be added to the denominator to increase stability.

Pseudocode for the preferred HIR convergence unit (186) is as follows:

```
class HIR_Convergence_Power
{
    // The HIRs
    HIR                hir,      sq_hir;
    // Intermediate signals for the second path
    Sample[ ]          input_sq, input_sq_hir;
    // Power metrics
    Rectangular_Mean   reference_power, output_power;
    // An epsilon used to avoid degeneracy in our metric
    float epsilon;
    void setup(
        int        L,
        Filter     integrator)
    {
        hir    .setup(L, copy_of(integrator));
        hir_sq.setup(L, copy_of(integrator));
        reference_power.setup(L, 0.0);
        output_power   .setup(L, 0.0);
        //Epsilon at -100 decibels; suitable for most applications
        epsilon = .00001;
    }
    void process(
        Sample[ ]  input,
        Sample[ ]  output,
        Sample[ ]  convergence,
        Range      range)
    {
        //Apply first HIR, producing output
        hir.process(input, output, range);
        //Square input signal and apply second HIR.
        modulate        (input, input, input_sq, range);
        hir_sq.process(input_sq, input_sq_hir);
        for (int i in range)
        {
            reference_power.update(i, input_sq_hir[i]);
```
```
            output_power   .update(i, output[i] * output[i]);
            convergence[i] = output_power.mean( ) /
                (reference_power.mean( ) + epsilon);
        }
    }
}
```

The initial configuration of the SAHIR rack (112) specifies a predetermined range (142) of the multi-frequency signal (136) to analyze. (FIG. 4). If the multi-frequency signal (136) is an audio signal, the SAHIR rack (112) specifies a predetermined pitch range within the multi-frequency signal (136) to analyze. The SAHIR rack (112) is provided with a phase processor (144). The phase processor (144) receives the signal (114) from the input receiver (116), shifts the phase of the signal (114), and outputs a plurality of output signals. The signals are QA (144), QB (146), QC (148), and QD (150).

Pseudocode for the preferred SAHIR rack (112) is as follows:

```
class SAHIR_Rack_0_7_2
{
    // Phase processor and the signals it produces
    VPP_BWPC        phase_processor;
    Sample[ ]       QA, QB, QC, QD;
    // Our resonators
    SAHIR_0_7_2     resonators[ ];
    int             count;
    void setup(
        float sample_rate,
        float freq_min,
        float freq_max)
    {
        // Normalize the frequencies
        float   norm_freq_min = freq_min / sample_rate,
                norm_freq_max = freq_max / sample_rate;
        // VPP's unity gain frequency should be well below freq_min
        float norm_freq_unity_gain = norm_freq_min / 4.0;
        phase_processor.setup(norm_freq_unity_gain);
        //Create resonators which cover our range
        create_resonators(freq_min, freq_max);
    }
    void create_resonators(
        float freq_min,
        float freq_max)
    {
        // A very simple resonator coverage algorithm.
        float
            range      = 1.25, range_half = sqrt(range),
            overlap    = 1.05;
        count = 0;
        for (float nf = freq_max; nf > freq_min;
            nf = (nf / range) * overlap)
        {
            resonators[count].setup(
                30,                  // Resolution
                nf / range_half,     // Center pitch
                range_half,          // Pitch span (from center)
                norm_freq_unity_gain);
            ++count;
        }
    }
    void process(
        Sample[ ] input,
        Range     range)
    {
        // Produce all phase signals from the input directly
        phase_processor.process(
            input, QA,
            input, QB,
            input, QC,
            input, QD,
            range);
```

```
        // Provide the signal to all resonators for analysis
        for (int i = 0; i < count; ++i)
        {
            resonator[i].process(QA, QB, QC, QD, range);
        }
    }
}
```

The self attuner (188) of the SAHIR (152), shown in FIG. 6, controls changes in the fundamental frequency of a SAHIR (152). The self attuner (188) detects and shifts the fundamental frequency of a SAHIR (152) toward potential harmonics identified by the self attuner (188). The self attuner (188) also counteracts time-distortion created by the SAHIR's (152) dynamic resampling.

The self attuner (188) is configured to define a normalized "center frequency" $F_C$, a frequency range G (where the range of attunable fundamental frequencies is $[F_C/G, F_C*G]$), and a delay length (L) in internal samples. The self attuner (188) computes a "base interval" as $1/F_C L$. An attunement factor is initialized to 1.0. The self attuner (188) defines the maximum value of the attunement factor as the frequency range G and defines the minimum value of the attunement factor as the inverse of the frequency range G.

The self attuner (188) reports a resampling interval equal to the base interval multiplied by the attunement factor. As the resampling interval increases, the resampler (184) captures new input samples less frequently and when the resampling interval decreases, the resampler (184) captures new input samples more frequently. The resampler (184) is a four-point hermite resampling algorithm. The resampler (184) is a continuous function of time based on the discrete signal. The input samples are the values produced and output by the resampler (184) when the resampler (184) inspects a particular point in time.

As shown in FIG. 2, the periodicity analysis system (100) computes some time metrics as multiples of the base interval, and others as multiples of a base period defined as L times the base interval.

The attunement factor, measured in base intervals, is denoted dt, and is averaged over L samples. This averaging produces the working period (Δ) between the current sample and the one L samples prior, measured in base periods. A consolidated interval, denoted awdt, is computed as the geometric mean of the latest dt and the one L samples prior and is measured in base intervals.

To obtain the reference period, measured in base periods, the periodicity analysis system (100) averages the consolidated interval awdt over L samples, producing the consolidated period, and averages the multiple of the working period Δ and the consolidated interval awdt over the last L samples, producing the reference mean. The reference period then becomes quotient of the reference mean over the consolidated period, or μ(Δawdt)/μ(awdt). FIG. 2.

The signal processor (104) also generates a pink power metric (220), which is (QC×QD) subjected to a weighted average (222) over 2L samples with dt as the weighting factor, and a full power metric (224), which is (QA×QA) subjected to a weighted average (226) over 2L samples with di as the weighting factor. The full power metric (224) divided (228) by the pink power metric (220) produces a brightness metric (230).

Figure 8:
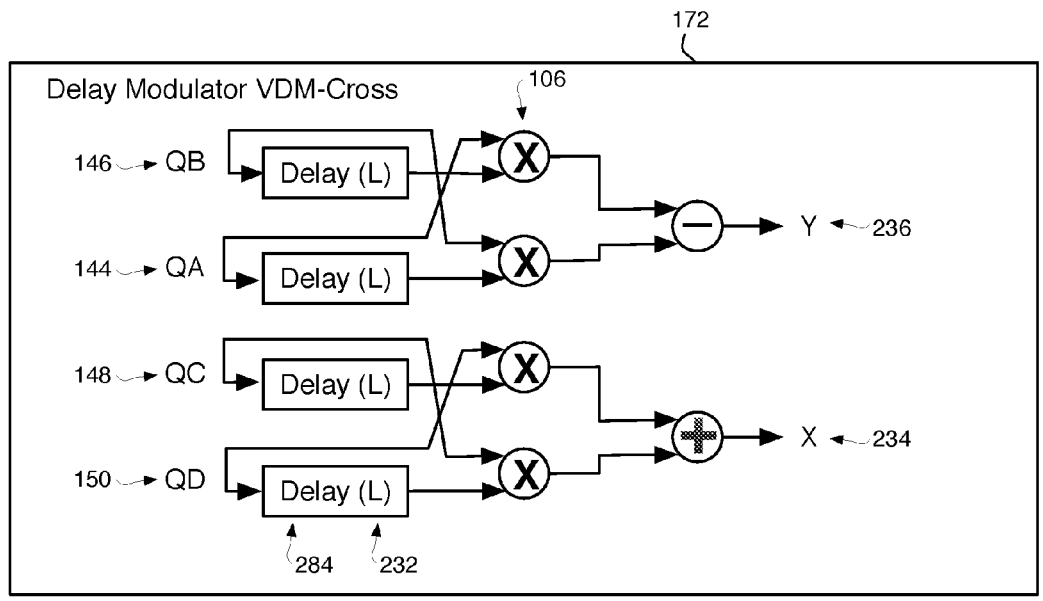
FIG. 8 illustrates a block diagram of the delay modulator in accordance with one embodiment.

As shown in FIGS. 2 and 8, the signal processor (104) incorporates a delay modulator (172) configured with a delay period of L samples (232). As described more fully below, the delay modulator (172) performs delay modulation of signals QA (144), QB (146), QC (148), and QD (150) to produce the first modulated output, denoted modX (234) and the second modulated output, denoted modY (236). The modulated outputs (234) and (236) are multiplied (238) by awdt (240) subjected to an unweighted average over L (242), producing a first averaged output (244) and a second averaged output (246). The averaged outputs (244) and (246) are divided (248) by the pink power metric (220), producing a first attunement vector component, denoted cavX (250), and a second attunement vector component, denoted cavY (252).

Figure 9:
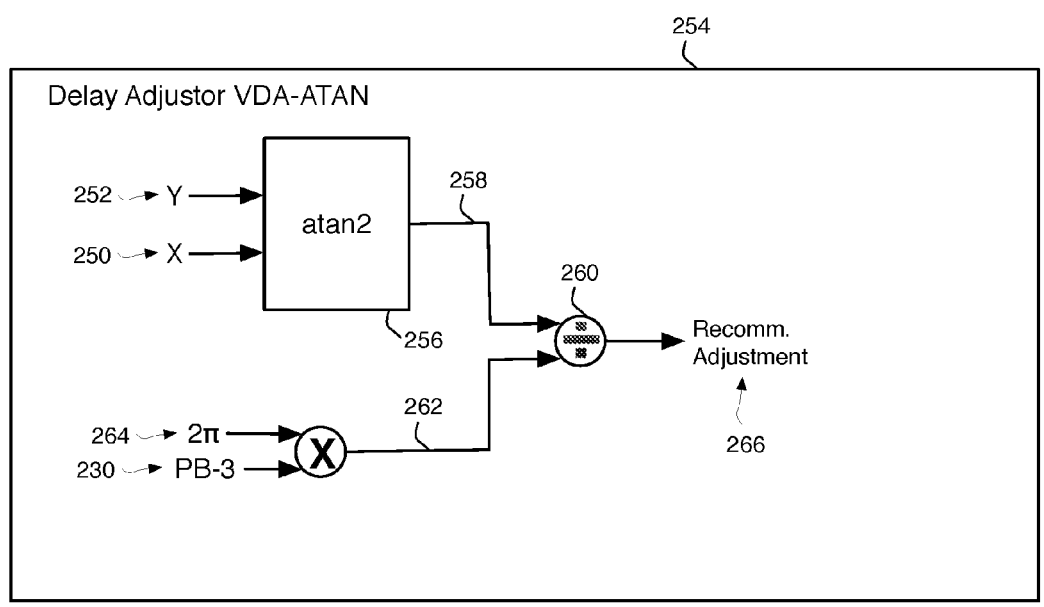
FIG. 9 illustrates a block diagram of the delay adjuster in accordance with one embodiment.

The signal processor (104) provides cavX (250) and cavY (252) to the delay adjuster (254), which, as shown in FIG. 9, computes a suggested adjustment in the working period of the resonator based upon cavX (250) and cavY (252) and the brightness metric (230). The suggested adjustment is added to the reference period, yielding the suggested period. The suggested period is constrained to lie between the minimum and maximum values of the attunement factor, yielding a new value for the attunement factor.

Pseudocode for the preferred self attuner (188) is as follows:

```
class SelfAttuner_0_7_2
{
    // Delay length in internal samples
    int         L;
    // Base internal and attunement factor range
    float       base_interval;
    float       attune_min, attune_max;
    // Attunement factor
    float       attunement;
    // Attunement factor memory
    float[ ]    dt;
    // Power and brightness metrics
    Rectangular_Mean    mean2L_AA_dt, mean2L_CD_dt;
    // Delay Modulator
    VDM_Cross   modulator;
    // Delay-modulator products
    Sample[ ]   modX, modY;
    // Attunement math
    Rectangular_Mean        meanL_awdt,
                            meanL_modX_awdt,
                            meanL_modY_awdt,
                            meanL_delta_awdt;
    // Delay Adjustor
    VDA_Atan adjustor;
    void setup(
        int     delay_samples,
        float   normfreq_center,
        float   freq_range)
    {
        L = delay_samples;
        base_interval = 1.0 / (L * normfreq_center);
        attunement = 1.0;
        attune_min = 1.0 / freq_range;
        attune_max = freq_range;
        // Power metrics
        mean2L_AA_dt    .setup(2*L, 0.0);
        mean2L_CD_dt    .setup(2*L, 0.0);
        // Attunement means
        meanL_awdt          .setup( L, 1.0);
        meanL_delta_awdt .setup( L, 1.0);
        meanL_modX_awdt .setup( L, 0.0);
        meanL_modY_awdt .setup( L, 1.0);
    }
    //Query the current resampling interval
    void resampling_interval( )
    {
        return base_interval * attunement;
    }
    //Analyze a new sample of input and update the internal rate
    void process(
        Sample[ ] QA, Sample[ ] QB,
        Sample[ ] QC, Sample[ ] QD,
```

```
    int      t)
{
    //Store delta-time
    dt[t] = attunement;
    // Delta = average attunement factor over the last L samples.
    meanL_dt.update(t, dt[t]);
    float delta = meenL_dt.mean( );
    // Compute power metrics
    mean2L_AA_dt.update(t, QA[t]*QA[t]*dt[t]);
    mean2L_CD_dt.update(t, QC[t]*QD[t]*dt[t]);
    float pink_power_dt = mean2L_CD_dt.mean( );
    float brightness_pb3 = mean2L_AA_dt.mean( ) / pink_power_dt;
    // Compute delay-modulation for this sample.
    modulator.process(
        QA, QB, QC, QD, modX, modY, L, t..t+1);
    // Compute the consolidated interval for modulator products.
    //     Also known as "attunement weighting delta-time"
    float awdt = sqrt(dt[t] * dt[t−L]);
    // Compute CAV by averaging (modX,modY) * awdt
    meanL_modX_awdt.update(t, modX*awdt);
    meanL_modY_awdt.update(t, modY*awdt);
    // CAV normalization, using relationship between dt and awdt
    float
        cavX = meanL_modX_awdt.mean( ) / pink_power_dt,
        cavY = meanL_modY_awdt.mean( ) / pink_power_dt;
    // The reference period is the mean delta, weighted by awdt.
    meanL_awdt        .update(t, awdt);
    meanL_delta_awdt.update(t, delta*awdt);
    float reference_period =
        meanL_delta_awdt.mean( ) / meanL_awdt.mean( );
    // Adjust our resampling interval via the attunement value.
    attunement = reference_period +
        adjustor.adjust(cavX, cavY, brightness_pb3);
    // Constrain attunement to enforce frequency range
    attunement = min(max(attunement, attune_min), attune_max);
    }
}
```

As shown in FIG. 9, the delay adjuster (254) computes a recommended adjustment in the resampling interval of a SAHIR (152) based on the attunement vector components cavX (250) and cavY (252), and the brightness metric (230). The delay adjuster (254) uses an inverse tangent function (256) to compute the heading (258) of the attunement vector (cavX, cavY) in radians, where the heading (258) of the attunement vector is expressed as a number within the range of $[-\pi,\pi]$. The delay adjuster (254) then divides (260) the heading (258) of the attunement vector by the product (262) of two times $\pi$ (264) times the brightness metric (230), yielding the recommended adjustment (266).

Pseudocode for the preferred delay adjuster (254) is as follows:

```
class VDA_Atan
{
    float adjust(
        float av_x, float av_y,
        float brightness)
    {
        return atan2(av_y, av_x) / (2 * π * brightness);
    }
}
```

Figure 10:
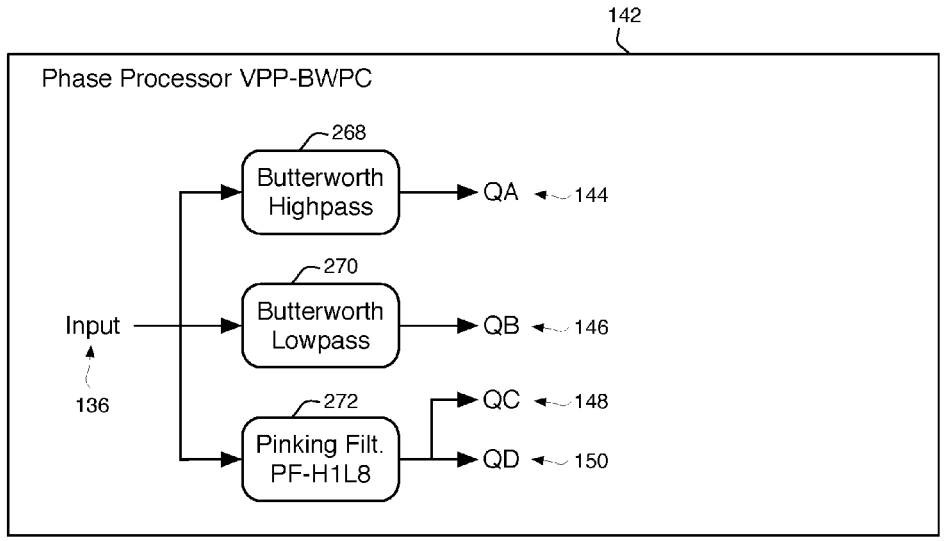
FIG. 10 illustrates a block diagram of the phase processor in accordance with one embodiment.

The phase processor (142) may produce QA (144), QB (146), QC (148), and QD (150) from the multi-frequency signal (136) as desired. As shown in FIG. 10, in the preferred embodiment, the phase processor (142) uses a first-order Butterworth Highpass filter (268) with a cutoff frequency equal to the unity-gain frequency of the phase processor to produce QA (144). The phase processor uses a first-order Butterworth Lowpass filter (270) with a cutoff frequency equal to the unity-gain frequency of the phase processor to produce QB (146). The phase processor (142) uses a pinking filter (272) to produce QC (148) and QD (150). The pinking filter (272) is designed to produce a magnitude response closely related to the QA and QB filters used elsewhere in the system. The pinking filter (272) exhibits an approximately 3 decibel per octave roll-off over a range encompassing most frequencies of interest.

Figure 11:
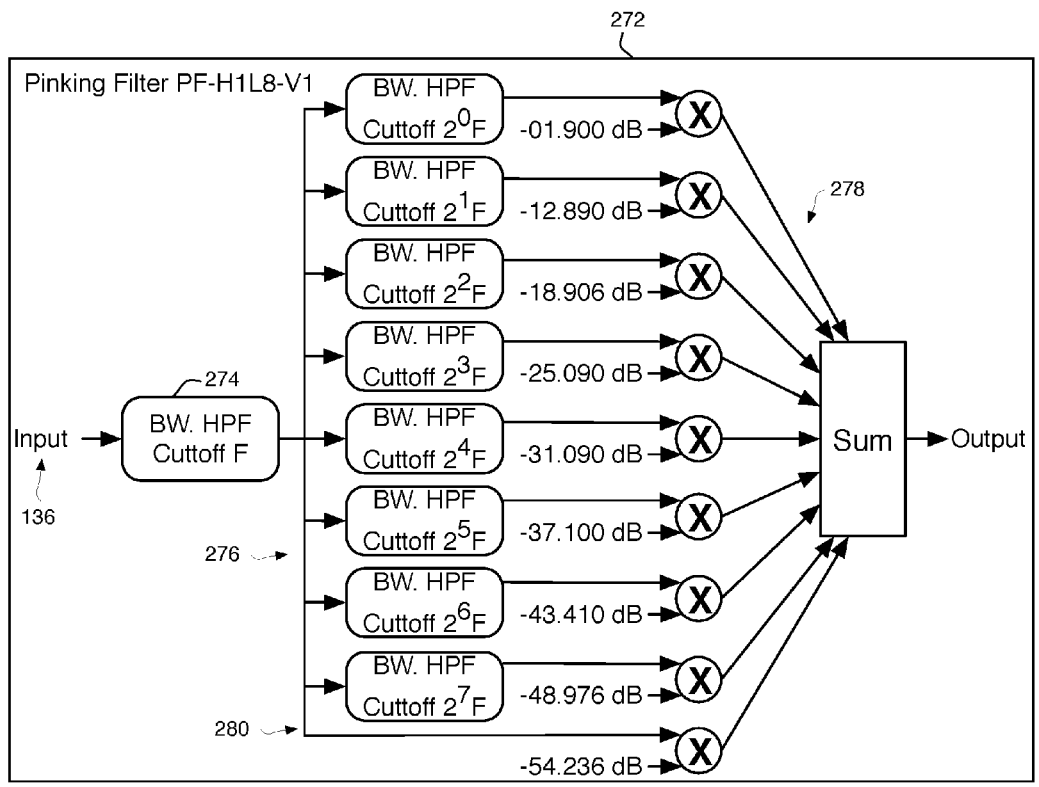
FIG. 11 illustrates a block diagram of the pinking filter in accordance with one embodiment.

As shown in FIG. 11, the pinking filter (272) consists of a first-order Butterworth high-pass filter (274) whose cut-off frequency is the unity gain frequency of the phase processor (142), and an array (276) of eight lowpass stages, comprising first-order Butterworth low-pass filters that receive their input from the high-pass filter and whose cut-off frequencies are derived from the unity gain frequency of the phase processor (142). No compensation is made for frequency warping, so these cut-off frequencies may exceed the Nyquist frequency. Each low-pass stage additionally comprises an amplification unit (278) that adjusts the amplitude of the low-pass stage's filter's output. A DC stage (280) comprises only an amplification unit and no low-pass filter. The outputs of the low-pass stages and DC stages are summed by a mixer (282) to produce output of the pinking filter (272), which is used as the signal QC (148) and signal QD (150). The cut-off frequencies and amplifications of the low-pass stages and DC stage are as follows:

| Stage | Cutoff | Gain Base | Gain Adjustment |
|---|---|---|---|
| Low-pass 1 | F*1 | $2^{-1} \approx -06$ dB | +4.10 dB |
| Low-pass 2 | F*4 | $2^{-2} \approx -12$ dB | −.890 dB |
| Low-pass 3 | F*16 | $2^{-3} \approx -18$ dB | −.906 dB |
| Low-pass 4 | F*64 | $2^{-4} \approx -24$ dB | −1.09 dB |
| Low-pass 5 | F*256 | $2^{-5} \approx -30$ dB | −1.09 dB |
| Low-pass 6 | F*1024 | $2^{-6} \approx -36$ dB | −1.10 dB |
| Low-pass 7 | F*4096 | $2^{-7} \approx -42$ dB | −1.41 dB |
| Low-pass 8 | F*16384 | $2^{-8} \approx -48$ dB | −.976 dB |
| DC | N/A | $2^{-9} \approx -54$ dB | −.236 dB |

Pseudocode for the preferred pinking filter (272) is as follows:

```
class PinkingFilter_BW1_H1L8
{
    //Filter stages
    struct Stage
    {
        Sample[ ]  result; //Intermediate signal
        Filter     filter;
    }
    Stage  highpass;
    Stage  lowpass    [8];
    float  lowpass_gain[8];
    float  dc_gain;
    void setup(
        float normalized_unity_gain_frequency)
    {
        //Set up highpass stage
        highpass.filter = new Highpass_BW1;
        highpass.filter.setup(normalized_unity_gain_freq);
        //Set up lowpass stages
        float cutoff = normalized_unity_gain_freq;
        float stage_gain = .5;
        for (int i = 0; i < 8; ++i)
        {
            lowpass    [i].filter = new Lowpass_BW1;
            lowpass    [i].filter.setup(cutoff);
            lowpass_gain[i] = stage_gain;
            cutoff      *= 4;
            stage_gain /= 2;
        }
        dc_gain = stage_gain;
        //Configure our hand-tuned filter mixing
```

```
lowpass_gain[0]   *= Decibels_to_Amplitude(+4.10);
lowpass_gain[1]   *= Decibels_to_Amplitude(-.890);
lowpass_gain[2]   *= Decibels_to_Amplitude(-.906);
lowpass_gain[3]   *= Decibels_to_Amplitude(-1.09);
lowpass_gain[4]   *= Decibels_to_Amplitude(-1.09);
lowpass_gain[5]   *= Decibels_to_Amplitude(-1.10);
lowpass_gain[6]   *= Decibels_to_Amplitude(-1.41);
lowpass_gain[7]   *= Decibels_to_Amplitude(-.976);
dc_gain           *= Decibels_to_Amplitude(-.236);
    }
    void process(
        Sample[ ] input, Sample[ ] output, Range range)
    {
        //Apply high-pass filter first
        highpass.filter.process(
            input, highpass.result, range);
        //Compute each low-pass filter's output
        for (int i = 0; i < 8; ++i)
            lowpass[i].filter.process(
                highpass.result, lowpass.result, range);
        //Mix the signals to produce our result
        for (int t in range)
        {
            output[t] = dc_gain * highpass.result[t];
            for (int i = 0; i < 8; ++i)
                output[t] = lowpass_gain[i] * lowpass[i].result[t];
        }
    }
}
```

The magnitude properties of QC (148) and QD (150) are preferably closely related to those of QA (144) and QB (146). One or more of the output signals QA (144), QB (146), QC (148), and QD (150) may have no phase shift, but preferably at least two of the output signals QA (144), QB (146), QC (148), and QD (150) have a phase shift relative to one another. The difference in phase response between the filter producing QB (146) and the filter producing QA (144) may be of any desired positive or negative value, but should generally be as close as possible to plus or minus 90 degrees within the predetermined range (142). Preferably the difference in phase response between the filter producing QC (148) and the filter producing QD (150) may be of any desired positive or negative value, but should generally be as close as possible to 0 degrees within the predetermined range (142). This results in a 90 degree phase difference between QA (144), QB (146) and a 0 degree phase difference between QC (148), and QD (150).

The unity gain frequency of the phase processor (142) is set to a predetermined fraction of the minimum pitch of interest within the predetermined range (142). The phase processor (142) is designed to have substantially the same magnitude response for all signals at a predetermined frequency (146). The predetermined frequency (146) is preferably a fraction of the lowest frequency of interest within the predetermined range (142).

The transformations producing QA (144) and QB (146) may be expressed as linear filters. These filters should be stable for all frequencies of interest. Preferably, QA (144) is substantially similar to signal (114) for frequencies above the predetermined frequency (146).

The logarithmic mean of the magnitude of response of QA (144) and QB (146), expressed in decibels as a function of frequency, preferably defines a "roll-off" of about −3 decibels per octave above the unity gain frequency. The logarithmic mean of the magnitude response of QC (148) and QD (150), expressed in decibels as a function of frequency, is for all frequencies of interest substantially similar to the former function.

Pseudocode for the preferred phase processor (142) is as follows:

```
class VPP_BWPC
{
    Highpass_BW1              qa_filter;
    Lowpass_BW1               qb_filter;
    PinkingFilter_BW1_H1L8    qc_filter;
    void setup(
        float normalized_unity_gain_frequency)
    {
        qa_filter.setup(normalized_unity_gain_frequency);
        qb_filter.setup(normalized_unity_gain_frequency);
        qc_filter.setup(normalized_unity_gain_frequency);
    }
    void process(
        Sample[ ] QA_in, Sample[ ] QA,
        Sample[ ] QB_in, Sample[ ] QB,
        Sample[ ] QC_in, Sample[ ] QC,
        Sample[ ] QD_in, Sample[ ] QD,
        Range range)
    {
        qa_filter.process(QA_in, QA, range);
        qb_filter.process(QB_in, QB, range);
        qc_filter.process(QC_in, QC, range);
        qc_filter.process(QD_in, QD, range);
    }
}
```

As shown in FIGS. 2 and 8, the delay modulator (172) is incorporated in the SAHIR (152). The delay modulator (172) has both a delay unit (284) and the modulation unit (106). As noted above, the delay modulator (172) delays and modulates signals QA (144), QB (146), QC (148), and QD (150) to produce modulated outputs modX (234) and modY (236). QA as received by the delay modulator (172) is the alpha signal. QC as received by the delay modulator (172) is the gamma signal. The delay unit (284) delays signal QB by the required interval, producing the beta signal, and the modulation unit (106) multiplies the beta signal by signal QA to produce a first modulated factor. The delay unit (284) similarly delays signal QA by the required interval and the modulation unit (106) multiplies the result by signal QB to produce a second modulated factor. The delay unit (284) then subtracts the second modulated factor from the first modulated factor to produce the modulated output modY (236). The delay unit (284) delays signal QC by the required interval and the modulation unit (106) multiplies the result by QD to produce a third modulated factor. The delay unit (284) similarly delays QD by the required interval, producing the delta signal, and the modulation unit (106) multiplies the delta signal by QC to produce a fourth modulated output. The modulation unit (106) then adds the third modulated factor with the fourth modulated factor to produce the modulated output modX (234). As previously described above, the periodicity analysis system (100) further adjusts these modulated outputs, modX (234) and modY (236), of the delay modulator (172) prior to providing them to the delay adjustor (254).

As noted above, the phase difference between signal QA and signal QB begins at 90 degrees at all frequencies and the phase difference between QC and QD begins at 0 degrees at all frequencies. After processing by the delay modulator (172) however, these phase differences might only remain preserved at the target frequencies (166) and (168). The modulation unit (106) may also perform extra modulations and mix the results to achieve a cleaner signal through frequency cancellation.

Pseudocode for the preferred delay modulator (172) is as follows:

```
class VDM_Cross
{
  void process(
      Sample[ ]  QA, Sample[ ] QB,
      Sample[ ]  QC, Sample[ ] QD,
      Sample[ ]  outputX,
      Sample[ ]  outputY,
      Range      range,
      int        delay_length)
  {
    for (int t in range)
    {
      outputX[t] =
            (QC[t] * QD[t - delay_length])
         +  (QD[t] * QC[t - delay_length]);
      outputY[t] =
            (QA[t] * QB[t - delay_length])
         -  (QB[t] * QA[t - delay_length]);
    }
  }
}
```

While in the preferred embodiment, the periodicity unit of the periodicity analysis system (100) is a delay adjuster (254) that produces a recommended adjustment (266) in the delay, the periodicity unit may be any system configured to identify a periodicity-related attribute, such as a frequency or repeated pattern, derived from the modulated output to produce a physically perceptible output based on the periodicity-related attribute.

Once the periodicity analysis system (100) determines the recommended adjustment (266) using the delay adjuster (254), the periodicity analysis system (100) examines the state of the SAHIRs (152), (154), (156) to determine whether the recommended adjustment (266), appears to indicate a periodicity (286), such as a frequency, in the multi-frequency signal (136) and preferably identifies the periodicity (286) in terms of frequency and other desired attributes. FIGS. 1-4. In the preferred embodiment, a user inputs a multi-frequency signal (136), which may be the user's voice (288), into the microphone (118) in a manner such as that known in the art. The periodicity analysis system (100) processes the multi-frequency signal (136), in manner such as that explained above, to identify a periodicity (286), such as the pitch of the user's voice (288), derived from the multi-frequency signal (136).

The periodicity analysis system (100) then produces a physically perceptible output based on the periodicity (286). Preferably, the periodicity analysis system (100) displays the determined periodicity (286), such as the pitch in real-time on a display, such as a display system (108) associated with the input receiver (102). The display system (108) may be any visual display, such as a graphical representation of the pitch, a musical note associated with the pitch, or a numerical representation or a needle meter tuner. In lieu of, or in addition to, the visual display, the periodicity analysis system (100) may produce other physically perceptible outputs, based on the periodicity (286). Such outputs may include audio feedback, which may be a tone or a representation of a musical instrument playing the identified pitch. Additional outputs could be computer instructions that instruct a computer such as the input receiver (102) to perform or not perform various operations. Similarly, outputs can be MIDI digital control signals used to operate the speaker (120), music technology such as the MIDI keyboard (116), synthesizers or the like. Other outputs may include haptic systems that output forces, vibrations, or other motions representative of the identified pitch, such as representing frequencies on the Braille terminal (118). The periodicity analysis system (100) can also be used to monitor machine that generate a waveform. If desired, the microphone (114) can be placed near the washing machine (126). The input receiver (102) can then be coupled to the electronic switch (124), which is coupled to the washing machine (126). The input receiver (102) can then be program to detect a waveform provided from the washing machine (126) through the microphone (114). The input receiver (102) can be programmed to turn off the electronic switch (124) if the input receiver (102) detects a change in the waveform, such as if the washing machine (126) becomes out of balance. Alternatively, the input receiver (102) can be programmed to activate an alarm or directly control the washing machine (126) in response to a change in the waveform. While the display system (108) is physically coupled to the input receiver (102), and the signal processor (104), a modulation unit (106) are integrated with the input receiver (102), the foregoing devices may be integrated with the input receiver (102) or coupled thereto, or to one another by wires or wirelessly.

Figure 12:
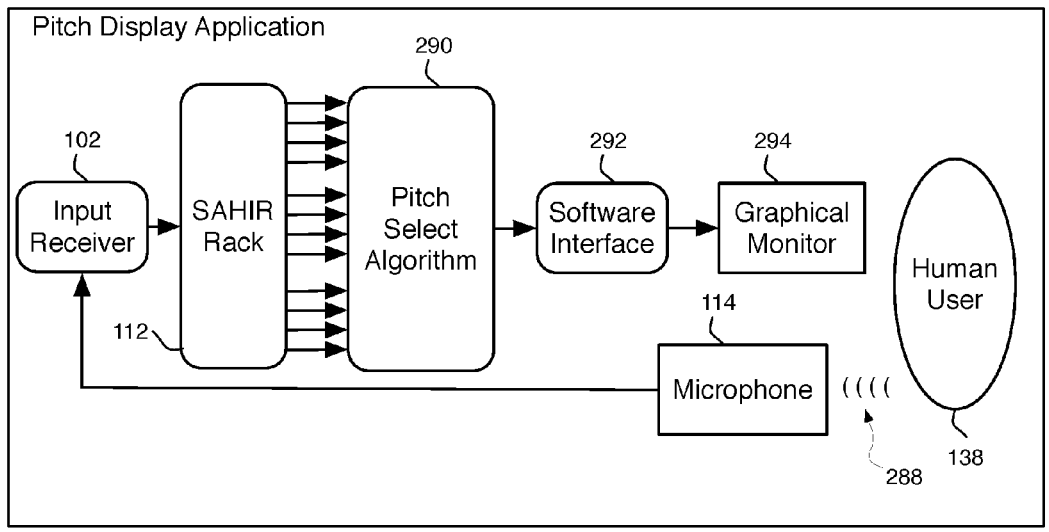
FIG. 12 illustrates a block diagram of the pitch display application in accordance with one embodiment.

To use a pitch selection embodiment of, the periodicity analysis system (100) of the present invention, a user (138) inputs their voice (288) by singing directly into the microphone (114). FIG. 12. The microphone (114) converts the voice (288) to a voltage output in a manner such as that known in the art. The input receiver (102) receives the voltage output from the microphone (114) and provides the voltage output to the SAHIR rack (112), which performs the operations described above. At any point during these operations the periodicity analysis system (100) may employ a simple pitch selection algorithm (290), to inspect the state and most recent output signals of each SAHIR (152) within the SAHIR rack (140).

The periodicity analysis system (100) is provided with display system software (292) having a graphical user interface (294) provided with information describing how a user may configure the software on the selection or non-selection of an active SAHIR (152). For instance, the periodicity analysis system (100) may employ a simple pitch selection system that queries the SAHIRs (152), (154), and (156) at predetermined times to detect whether the convergence metric of any SAHIR (152) exceeds a threshold of 80%. From those SAHIRs (152), (154), and (156) with a convergence metric that exceeds a threshold of 80% the pitch selection algorithm (290) selects the SAHIR (152) with the highest convergence metric as the active SAHIR (152). If the pitch selection algorithm (290) detects no convergence metric of any SAHIR (152) exceeding a threshold of 80%, the pitch selection algorithm selects no active SAHIR (152).

Once the pitch selection algorithm (290) selects an active SAHIR (152), the pitch selection algorithm (290) calculates the fundamental frequency of the active SAHIR (152) as S/LR, where S is the sampling rate of the input signal in hertz, L is the active SAHIR's resolution, and R is the resampling interval of the active SAHIR (152). If there is no active SAHIR (152), the fundamental frequency (170) is not applicable. If the pitch selection algorithm (290) identifies an active SAHIR (152), the display system is additionally provided with the fundamental frequency (170) of the active SAHIR (152) and any other desired metrics associated with the identified fundamental frequency. The display system (108) displays the graphical user interface (294). The graphical user interface (294) presents the fundamental frequency (170) of the active SAHIR (152) and any other desired metrics in a visual format, using known rendering systems. As the fundamental frequency (170) of the active SAHIR (152) is derived from the pitch of the user's voice (288) input into the microphone (114), the display is a real-time visual representation of the pitch of the user's voice (288) the user (138) input into the microphone (114). The graphical user interface (294) preferably has controls that allow the user (138) to change how the fundamental frequency (170) of the active SAHIR (152) is displayed, and what additional information associated with the identified fundamental frequency (170) the user (138) wants displayed. The graphical user interface (294) also allows the user (138) to control the audio and/or haptic outputs of the identified fundamental frequency (170) and associated metrics.

An alternative embodiment of the present invention uses scalar self-attunement frequency analyzer with an integrator. In this embodiment, the scalar self-attunement frequency analyzer processes an input signal from an input receiver using a phase processor to produce two signals in approximate total quadrature over a predetermined frequency range. The scalar self-attunement frequency analyzer processes the first signal, QA, from the input by a leveling filter, followed by a two-sample average. The scalar self-attunement frequency analyzer processes the second signal, QB, from the input by a feedback comb filter (HIR), an identical leveling filter, a stable integrator filter, a one-sample delay, and additional amplification which equates the magnitude of QA and QB at the fundamental frequency of the resonator.

The leveling filter is a Linkwitz-Riley highpass filter whose cutoff frequency is configured to one quarter of the fundamental frequency of the resonator. The stable integrator filter may be expressed as the integral of the sum of its input and the rectangular mean of its own previous L outputs, multiplied by 2/L. Subtraction of the rectangular mean compensates for the inherent instability of the integral.

QB is delayed by L samples, then multiplied with QA, and the resulting signal is averaged over L internal samples, scaled and subjected to a "bias correction formula" to produce an adjustment in the inverse of the period of the resonator. (This embodiment assumes an input signal of 0 dB power and makes no adjustments to compensate for unexpected values of signal power.) The bias correction formula is $4/(4+x)-1$.

The variable working period is controlled by a dynamic resampling scheme such as that described above in reference to the earlier system. The method used to determine the "convergence" of the periodicity is also the same, and is reproduced in pseudocode below. The revision to the filtering scheme used by this scalar self-attunement frequency analyzer to produce QA and QB resolves the issues with earlier self-attunement frequency analyzers. Whereas earlier systems use a differentiator, the scalar self-attunement frequency analyzer uses the integrator described herein, preventing higher frequencies from having a greater influence over the attunement process than lower ones. The integrator emphasizes lower frequencies, thereby increasing the range of fundamental frequencies for which a resonator of the scalar self-attunement frequency analyzer may synchronize with periodicity rich in upper harmonics.

Pseudocode for the SAHIR Rack and SAHIR used in the scalar self-attunement frequency analyzer is as follows:

```
class SAHIR_Rack_0_6_0
{
    // Our resonators
    SAHIR_0_6_0    resonators[ ];
    int            count;
```

```
    void setup(
        float sample_rate,
        float freq_min,
        float freq_max)
    {
        // Normalize the frequencies
        float norm_freq_min = freq_min / sample_rate,
              norm_freq_max = freq_max / sample_rate;
        //Create resonators which cover our range
        create_resonators(freq_min, freq_max);
    }
    void create_resonators(
        float freq_min,
        float freq_max)
    {
        // A very simple resonator coverage algorithm.
        float
            range    = 1.25, range_half = sqrt(range),
            overlap  = 1.05;
        count = 0;
        for (float nf = freq_max; nf > freq_min;
            nf = (nf / range) * overlap)
        {
            resonators[count].setup(
                30,                           // Resolution
                nf / range_half,              // Center pitch
                range_half);                  // Pitch span (from center)
            ++count;
        }
    }
    void process(
        Sample[ ]  input,
        Range      range)
    {
        // Provide the signal to all resonators for analysis
        for (int i = 0; i < count; ++i)
        {
            resonator[i].process(input, range);
        }
    }
}
//A SAHIR with built-in HIR & scalar self-attunement function.
class SAHIR_0_6_0
{
    //Resampling
    Resample_4P_Hermite   resampler;
    float                 t_fraction;
    //Internal (variable-samplerate) signal
    int                   vsr_t;
    Sample[ ]             vsr_input;
    //HIR cofiguration & HIR output signal
    float                 hir_alpha;
    Sample[ ]             vsr_output;
    //High-pass filter
    Highpass_LR2          highpass;
    Sample[ ]             vsr_input_highpass,
                          vsr_output_highpass;
    //Integrator (QB process)
    float                 integral_amp;
    Rectangular_Mean      integral_feedback;
    Sample[ ]             vsr_integral;
    //Convergence metric
    Rectangular_Mean      power_input,
                          power_output,
                          power_diff;
    Sample[ ]             vsr_convergence;
    // Attunement filter
    Rectangular_Mean      attunement_bias;
    void setup(
        int    resolution,
        float  normfreq_center,
        float  frequency_range)
    {
        // Internal timer starts at zero
        vsr_t = 0;
        t_fraction = 0.0;
        // Set up HIR and convergence metric
        hir_alpha = .5;
        power_input .setup(resolution, 0.0);
```

```
    power_output.setup(resolution, 0.0);
    power_diff.setup(resolution, 0.0);
    // High-pass filter configuration
    highpass.setup(.25 / resolution);
    // Set up integral
    integral_amp = (2.0 * π) / resolution;
    integral_feedback.setup(resolution, 0.0);
    // Input amplification factors
    amp_QB = normfreq_center / normfreq_vpp_unity_gain;
    amp_QCD = sqrt(QB_amp);
    // Set up attuner & resampling
    base_rate = 1.0 / (normfreq_center * resolution);
    attunement = 0.0;
    attune_min = 1.0 / frequency_range;
    attune_max = 1.0 * frequency_range;
    attunement_bias.setup(resolution, 0.0);
  }
  void process(
    Sample[ ]  input,
    Range      range)
  {
    // Perform variable-rate processing on the prepared signals
    for (int t in range)
    {
      // Acquire samples until we pass time 't'
      while (t_fraction < 1.0)
      {
        // Compute the time coordinate for 1 samples ago.
        int vsr_t_prev = vsr_t - resolution;
        // Acquire a new sample at the internal rate.
        vsr_input[vsr_t] =
          resampler.sample(input, t, t_fraction);
        // Feedback comb Filtering (Our simple HIR)
        vsr_hir_output[vsr_t_prev] =
          (1 - hir_alpha) * vsr_output[vsr_t_prev]
          + hir_alpha * vsr_input [vsr_t];
        // Compute convergence
        float
          v_in   = vsr_input [t],
          v_out  = vsr_output[t],
          v_diff = v_in - v_out;
        power_input .update(vsr_t, v_in   * v_in);
        power_output.update(vsr_t, v_out  * v_out);
        power_diff  .update(vsr_t, v_diff * v_diff);
        vsr_convergence[vsr_t] =
          (power_output_mean( ) - power_diff.mean( ))
          / power_input.mean( );
        // Compute high-pass signals
        highpass.process(vsr_input, vsr_input_highpass,
          vsr_t..vsr_t);
        highpass.process(vsr_output, vsr_output_highpass,
          vsr_t..vsr_t);
        // Compute QA and QB.
        float QA = .5 *
          ( vsr_input_highpass[vsr_t]
          + vsr_input_highpass[vsr_t-1]);
        float QB = integral_amp *
          ( vsr_output_highpass[vsr_t-1]
          - (2.0 / resolution) * integral_feedback.mean( ));
        integral_feedback.update(vsr_t, QB);
        // Compute the attunement adjustment.
        attunement_bias.update(vsr_t, QA*QB);
        float adjustment =
          4.0 / (attunement_bias.mean( )+4.0) - 1.0;
        // Apply the adjustment to the inverse attunement factor
        attunement = 1.0 / (1.0 / attunement + adjustment);
        // Limit the attunement factor to the defined range
        attunement =
          min(max(attunement, attune_min), attune_max);
        // Advance internal time, and our resampling clock.
        t_fraction += base_rate * attunement;
        ++vsr_t;
      }
      t_fraction -= 1.0;
    }
  }
}
```

An alternative embodiment of the present system uses the vector form of the system for processing analog signals. The following details a simple scalar alternative embodiment suitable for monitoring machine oscillations. An input receiver receives an input signal, such as an electrical signal. The system bifurcates the input signal and routes the split signal to a first-order Butterworth highpass, yielding a QA signal, and a first-order Butterworth lowpass, yielding a QB signal. The aforementioned highpass and lowpass are preferably calibrated to use the same cut-off frequency.

The system delays the QB signal by a predetermined amount, utilizing an analog delay line unit, yielding a delayed QB signal. A ring modulator is used to modulate the QA signal by the delayed QB signal, yielding an attunement heuristic signal. The system subjects the attunement heuristic signal to a low-pass filter having a low value of cutoff frequency, yielding the attunement bias signal. The attunement bias signal is a periodicity-related attribute derived from the modulated QA and delayed QB signal, which the system outputs.

A device implementing the system is preferably configured to receive an oscillating acoustic, magnetic or electrical signal emitted or produced by a machine. The signal preferably comprises multiple different harmonics of the fundamental oscillation frequency. The system may further be calibrated so that the amount of delay in its analog delay line is equal to the optimal oscillation period of the device. If configured in this manner, the value attunement bias signal will tend to indicate whether the oscillation period is above, below or equal to the optimal value. Thus the system may be used in a control module to adjust power to the machine to regulate the oscillation speed of the machine with high precision.

Although the invention has been described with respect to a preferred embodiment thereof, it is to be understood that it is not to be so limited since changes and modifications can be made therein which are within the full, intended scope of this invention as defined by the appended claims.

What is claimed is:

1. A scalar periodicity analysis system for converting a physically perceptible input to a physically perceptible output derived from a measurement of a periodicity-related attribute of the input by generating the measurement from the input and using the measurement to derive the output that is different from the input, the system comprising:
   an input receiver;
   a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency and a beta signal comprising at least the first target frequency and the second target frequency;
   wherein at least one signal of the group consisting of the alpha signal and the beta signal is a digital signal, and wherein the signal processor defines a working Nyquist frequency associated with the highest Nyquist frequency of the alpha signal and the beta signal;
   wherein the signal processor when receiving an input signal, comprising at least a first frequency of a first magnitude and a second frequency of a second magnitude, wherein the second frequency is a higher frequency than the first frequency, and wherein both the first frequency and the second frequency are below half the working Nyquist frequency, outputs the alpha signal and the beta signal, wherein the alpha signal comprises the first frequency at a first alpha magnitude and the second frequency at a second alpha magnitude, wherein the beta signal comprises the first frequency at a first beta magnitude and the second frequency at a second beta magnitude, and wherein the product of the first alpha magnitude, the first beta magnitude and the square of the second magnitude, is greater than the product of the second alpha magnitude, the second beta magnitude and the square of the first magnitude;

wherein the alpha signal has a first group delay difference with the beta signal at the first target frequency;

wherein the alpha signal has a second group delay difference with the beta signal at the second target frequency;

wherein the alpha signal has a first phase difference with the beta signal at the first target frequency;

wherein the alpha signal has a second phase difference with the beta signal at the second target frequency;

wherein the first phase difference is between 80 and 100 degrees;

wherein the second phase difference is between 80 and 100 degrees;

wherein the first group delay difference is within 90% and 110% of the second group delay difference;

wherein the first group delay difference is greater than zero;

a modulation unit configured to multiply at least the alpha signal and the beta signal to produce a modulated output; and a scalar periodicity unit configured to generate a measurement of the attribute of the input derived from the modulated output to produce a physically perceptible output based on the measurement, to overcome latency in audio recognition, wherein the physically perceptible output is different than, and derived from, the input and wherein the physically perceptible output is derived from the measurement.

2. An analog scalar periodicity analysis system for converting a physically perceptible input to a physically perceptible output derived from a measurement of a periodicity-related attribute of the input by generating the measurement from the input and using the measurement to derive the output that is different from the input, the system comprising:

an input receiver;

a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency and a beta signal comprising at least the first target frequency and the second target frequency, wherein at least one signal of the group consisting of the alpha signal and the beta signal is an analog signal;

wherein the alpha signal has a first group delay difference with the beta signal at the first target frequency;

wherein the alpha signal has a second group delay difference with the beta signal at the second target frequency;

wherein the alpha signal has a first phase difference with the beta signal at the first target frequency;

wherein the alpha signal has a second phase difference with the beta signal at the second target frequency;

wherein the first phase difference is between 80 and 100 degrees;

wherein the second phase difference is between 80 and 100 degrees;

wherein the first group delay difference is within 90% and 110% of the second group delay difference;

wherein the first group delay difference is greater than zero;

a modulation unit configured to multiply at least the alpha signal and the beta signal to produce a modulated output; and a scalar periodicity unit configured to generate a measurement of the attribute of the input derived from the modulated output to produce a physically perceptible output based on the measurement, to overcome latency in audio recognition, wherein the physically perceptible output is different than, and derived from, the input and wherein the physically perceptible output is derived from the measurement.

3. A vector periodicity analysis system for converting a physically perceptible input to a physically perceptible output derived from a measurement of a periodicity-related attribute of the input by generating the measurement from the input and using the measurement to derive the output that is different from the input, the system comprising:

an input receiver;

a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency, a beta signal comprising at least the first target frequency and the second target frequency, and a gamma signal comprising at least the first target frequency and the second target frequency;

a first modulation unit configured to multiply at least the alpha signal and the beta signal to produce a first modulated output;

a second modulation unit configured to multiply at least the gamma signal and the delta signal to produce a second modulated output, wherein the delta signal is selected from the group comprising the alpha signal, the beta signal and an additional signal produced by the signal processor;

wherein the alpha signal has a first group delay difference with the beta signal at the first target frequency;

wherein the alpha signal has a second group delay difference with the beta signal at the second target frequency;

wherein the alpha signal has a first phase difference with the beta signal at the first target frequency;

wherein the alpha signal has a second phase difference with the beta signal at the second target frequency;

wherein the first phase difference is within 10 degrees of the second phase difference;

wherein the first group delay difference is within 90% and 110% of the second group delay difference;

wherein the gamma signal has a third group delay difference with the delta signal at the first target frequency;

wherein the gamma signal has a fourth group delay difference with the delta signal at the second target frequency;

wherein the gamma signal has a third phase difference with the delta signal at the first target frequency;

wherein the gamma signal has a fourth phase difference with the delta signal at the second target frequency;
wherein the third phase difference is within 10 degrees of the fourth phase difference;
wherein the third group delay difference is within 90% and 110% of the fourth group delay difference;
wherein the first phase difference is greater than 10 degrees;
wherein the second phase difference is greater than 10 degrees;
wherein the first group delay difference is greater than zero;
wherein the third group delay difference is greater than zero; and
a vector periodicity unit configured to generate a measurement of the attribute of the input derived from the first modulated output and the second modulated output to produce a physically perceptible output based on the measurement, to overcome latency in audio recognition, wherein the physically perceptible output is different than, and derived from, the input and wherein the physically perceptible output is derived from the measurement.

4. A scalar periodicity analysis system for converting a physically perceptible input to a physically perceptible output derived from a measurement of a periodicity-related attribute of the input by generating the measurement from the input and using the measurement to derive the output that is different from the input, the system comprising:
an input receiver;
a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency and a beta signal comprising at least the first target frequency and the second target frequency;
wherein at least one signal of the group consisting of the alpha signal and the beta signal is a digital signal, and wherein the signal processor defines a working Nyquist frequency associated with the highest Nyquist frequency of the alpha signal and the beta signal;
wherein the signal processor when receiving an input signal, comprising at least a first frequency of a first magnitude and a second frequency of a second magnitude, wherein the second frequency is a higher frequency than the first frequency, and wherein both the first frequency and the second frequency are below half the working Nyquist frequency, outputs the alpha signal and the beta signal, wherein the alpha signal comprises the first frequency at a first alpha magnitude and the second frequency at a second alpha magnitude, wherein the beta signal comprises the first frequency at a first beta magnitude and the second frequency at a second beta magnitude, and wherein the product of the first alpha magnitude, the first beta magnitude and the square of the second magnitude, is greater than the product of the second alpha magnitude, the second beta magnitude and the square of the first magnitude;
wherein the alpha signal has a first group delay difference with the beta signal at the first target frequency;
wherein the alpha signal has a second group delay difference with the beta signal at the second target frequency;
wherein the alpha signal has a first phase difference with the beta signal at the first target frequency;
wherein the alpha signal has a second phase difference with the beta signal at the second target frequency;
wherein the first phase difference is between 80 and 100 degrees;
wherein the second phase difference is between 80 and 100 degrees;
wherein the first group delay difference is within 90% and 110% of the second group delay difference;
wherein the first group delay difference is greater than zero;
a modulation unit configured to multiply at least the alpha signal and the beta signal to produce a modulated output; and
a scalar periodicity unit configured to generate a measurement of the attribute of the input derived from the modulated output to produce a physically perceptible output based on the measurement, to overcome latency in image recognition, wherein the physically perceptible output is different than, and derived from, the input and wherein the physically perceptible output is derived from the measurement.

5. An analog scalar periodicity analysis system for converting a physically perceptible input to a physically perceptible output derived from a measurement of a periodicity-related attribute of the input by generating the measurement from the input and using the measurement to derive the output that is different from the input, the system comprising:
an input receiver;
a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency and a beta signal comprising at least the first target frequency and the second target frequency, wherein at least one signal of the group consisting of the alpha signal and the beta signal is an analog signal;
wherein the alpha signal has a first group delay difference with the beta signal at the first target frequency;
wherein the alpha signal has a second group delay difference with the beta signal at the second target frequency;
wherein the alpha signal has a first phase difference with the beta signal at the first target frequency;
wherein the alpha signal has a second phase difference with the beta signal at the second target frequency;
wherein the first phase difference is between 80 and 100 degrees;
wherein the second phase difference is between 80 and 100 degrees;
wherein the first group delay difference is within 90% and 110% of the second group delay difference;
wherein the first group delay difference is greater than zero;
a modulation unit configured to multiply at least the alpha signal and the beta signal to produce a modulated output; and
a scalar periodicity unit configured to generate a measurement of the attribute of the input derived from the modulated output to produce a physically perceptible output based on the measurement, to overcome latency in image recognition, wherein the physically perceptible output is different than, and derived from, the input and wherein the physically perceptible output is derived from the measurement.

6. A vector periodicity analysis system for converting a physically perceptible input to a physically perceptible output derived from a measurement of a periodicity-related attribute of the input by generating the measurement from the input and using the measurement to derive the output that is different from the input, the system comprising:
an input receiver;
a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency, a beta signal comprising at least the first target frequency and the second target frequency, and a gamma signal comprising at least the first target frequency and the second target frequency;
a first modulation unit configured to multiply at least the alpha signal and the beta signal to produce a first modulated output;
a second modulation unit configured to multiply at least the gamma signal and the delta signal to produce a second modulated output, wherein the delta signal is selected from the group comprising the alpha signal, the beta signal and an additional signal produced by the signal processor;
wherein the alpha signal has a first group delay difference with the beta signal at the first target frequency;
wherein the alpha signal has a second group delay difference with the beta signal at the second target frequency;
wherein the alpha signal has a first phase difference with the beta signal at the first target frequency;
wherein the alpha signal has a second phase difference with the beta signal at the second target frequency;
wherein the first phase difference is within 10 degrees of the second phase difference;
wherein the first group delay difference is within 90% and 110% of the second group delay difference;
wherein the gamma signal has a third group delay difference with the delta signal at the first target frequency;
wherein the gamma signal has a fourth group delay difference with the delta signal at the second target frequency;
wherein the gamma signal has a third phase difference with the delta signal at the first target frequency;
wherein the gamma signal has a fourth phase difference with the delta signal at the second target frequency;
wherein the third phase difference is within 10 degrees of the fourth phase difference;
wherein the third group delay difference is within 90% and 110% of the fourth group delay difference;
wherein the first phase difference is greater than 10 degrees;
wherein the second phase difference is greater than 10 degrees;
wherein the third group delay difference is greater than zero; and
a vector periodicity unit configured to generate a measurement of the attribute of the input derived from the first modulated output and the second modulated output to produce a physically perceptible output based on the measurement, to overcome latency in image recognition, wherein the physically perceptible output is different than, and derived from, the input and wherein the physically perceptible output is derived from the measurement.

7. A scalar periodicity analysis system for converting a physically perceptible input to a physically perceptible output derived from a measurement of a periodicity-related attribute of the input by generating the measurement from the input and using the measurement to derive the output that is different from the input, the system comprising:
an input receiver;
a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency and a beta signal comprising at least the first target frequency and the second target frequency;
wherein at least one signal of the group consisting of the alpha signal and the beta signal is a digital signal, and wherein the signal processor defines a working Nyquist frequency associated with the highest Nyquist frequency of the alpha signal and the beta signal;
wherein the signal processor when receiving an input signal, comprising at least a first frequency of a first magnitude and a second frequency of a second magnitude, wherein the second frequency is a higher frequency than the first frequency, and wherein both the first frequency and the second frequency are below half the working Nyquist frequency, outputs the alpha signal and the beta signal, wherein the alpha signal comprises the first frequency at a first alpha magnitude and the second frequency at a second alpha magnitude, wherein the beta signal comprises the first frequency at a first beta magnitude and the second frequency at a second beta magnitude, and wherein the product of the first alpha magnitude, the first beta magnitude and the square of the second magnitude, is greater than the product of the second alpha magnitude, the second beta magnitude and the square of the first magnitude;
wherein the alpha signal has a first group delay difference with the beta signal at the first target frequency;
wherein the alpha signal has a second group delay difference with the beta signal at the second target frequency;
wherein the alpha signal has a first phase difference with the beta signal at the first target frequency;
wherein the alpha signal has a second phase difference with the beta signal at the second target frequency;
wherein the first phase difference is between 80 and 100 degrees;
wherein the second phase difference is between 80 and 100 degrees;
wherein the first group delay difference is within 90% and 110% of the second group delay difference;
wherein the first group delay difference is greater than zero;
a modulation unit configured to multiply at least the alpha signal and the beta signal to produce a modulated output; and
a scalar periodicity unit configured to generate a measurement of the attribute of the input derived from the modulated output to produce a physically perceptible output based on the measurement, to overcome latency in mechanical vibration recognition, wherein the physically perceptible output is different than, and derived from, the input and wherein the physically perceptible output is derived from the measurement.

8. An analog scalar periodicity analysis system for converting a physically perceptible input to a physically perceptible output derived from a measurement of a periodicity-related attribute of the input by generating the measurement from the input and using the measurement to derive the output that is different from the input, the system comprising:
an input receiver;
a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency and a beta signal comprising at least the first target frequency and the second target frequency, wherein at least one signal of the group consisting of the alpha signal and the beta signal is an analog signal;
wherein the alpha signal has a first group delay difference with the beta signal at the first target frequency;
wherein the alpha signal has a second group delay difference with the beta signal at the second target frequency;
wherein the alpha signal has a first phase difference with the beta signal at the first target frequency;
wherein the alpha signal has a second phase difference with the beta signal at the second target frequency;
wherein the first phase difference is between 80 and 100 degrees; wherein the second phase difference is between 80 and 100 degrees;
wherein the first group delay difference is within 90% and 110% of the second group delay difference;
wherein the first group delay difference is greater than zero;
a modulation unit configured to multiply at least the alpha signal and the beta signal to produce a modulated output; and
a scalar periodicity unit configured to generate a measurement of the attribute of the input derived from the modulated output to produce a physically perceptible output based on the measurement, to overcome latency in mechanical vibration recognition, wherein the physically perceptible output is different than, and derived from, the input and wherein the physically perceptible output is derived from the measurement.

9. A vector periodicity analysis system for converting a physically perceptible input to a physically perceptible output derived from a measurement of a periodicity-related attribute of the input by generating the measurement from the input and using the measurement to derive the output that is different from the input, the system comprising:
an input receiver;
a signal processor defining a first target frequency and a second target frequency and configured to receive a physically perceptible input from the input receiver, wherein the input comprises a signal having a periodicity-related attribute and a set of input frequencies, and wherein the signal processor is configured to process the input into an alpha signal comprising at least the first target frequency and the second target frequency, a beta signal comprising at least the first target frequency and the second target frequency, and a gamma signal comprising at least the first target frequency and the second target frequency;
a first modulation unit configured to multiply at least the alpha signal and the beta signal to produce a first modulated output;
a second modulation unit configured to multiply at least the gamma signal and the delta signal to produce a second modulated output, wherein the delta signal is selected from the group comprising the alpha signal, the beta signal and an additional signal produced by the signal processor;
wherein the alpha signal has a first group delay difference with the beta signal at the first target frequency;
wherein the alpha signal has a second group delay difference with the beta signal at the second target frequency;
wherein the alpha signal has a first phase difference with the beta signal at the first target frequency;
wherein the alpha signal has a second phase difference with the beta signal at the second target frequency;
wherein the first phase difference is within 10 degrees of the second phase difference;
wherein the first group delay difference is within 90% and 110% of the second group delay difference;
wherein the gamma signal has a third group delay difference with the delta signal at the first target frequency;
wherein the gamma signal has a fourth group delay difference with the delta signal at the second target frequency;
wherein the gamma signal has a third phase difference with the delta signal at the first target frequency;
wherein the gamma signal has a fourth phase difference with the delta signal at the second target frequency;
wherein the third phase difference is within 10 degrees of the fourth phase difference;
wherein the third group delay difference is within 90% and 110% of the fourth group delay difference;
wherein the first phase difference is greater than 10 degrees;
wherein the second phase difference is greater than 10 degrees;
wherein the first group delay difference is greater than zero;
wherein the third group delay difference is greater than zero; and
a vector periodicity unit configured to generate a measurement of the attribute of the input derived from the first modulated output and the second modulated output to produce a physically perceptible output based on the measurement, to overcome latency in mechanical vibration recognition, wherein the physically perceptible output is different than, and derived from, the input and wherein the physically perceptible output is derived from the measurement.

* * * * *

UNITED STATES PATENT AND TRADEMARK OFFICE
CERTIFICATE OF CORRECTION

PATENT NO.         : 9,721,159 B2
APPLICATION NO.    : 14/875404
DATED              : August 1, 2017
INVENTOR(S)        : Balster It is certified that error appears in the above-identified patent and that said Letters Patent is hereby corrected as shown below:

In the Specification

Column 7, Line 37, delete "MR" and insert therefor --HIR--.

Column 10, Line 62, delete "or" and insert therefor --of--.

Column 13, Line 62, delete "di" and insert therefor --dt--.

Column 14, Line 27, delete "internal" and insert therefor --interval--.

Column 15, Line 8, delete "meenL_dt.mean( )" and insert therefor --meanL_dt.mean( )--.

In the Claims

Column 29, Line 63, Claim 6, following "wherein the second phase difference is greater than 10 degrees" and before "wherein the third group delay difference is greater than zero", insert --wherein the first group delay difference is greater than zero;--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*